(12) United States Patent
Akuzawa et al.

(10) Patent No.: US 10,191,490 B2
(45) Date of Patent: Jan. 29, 2019

(54) MARINE VESSEL

(71) Applicant: YAMAHA HATSUDOKI KABUSHIKI KAISHA, Iwata-shi, Shizuoka (JP)

(72) Inventors: Shu Akuzawa, Shizuoka (JP); Yusuke Ashida, Shizuoka (JP); Hirotaka Aoki, Shizuoka (JP); Yukitaka Okamoto, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/617,057

(22) Filed: Jun. 8, 2017

(65) Prior Publication Data
US 2018/0004209 A1    Jan. 4, 2018

(30) Foreign Application Priority Data
Jun. 30, 2016 (JP) .................... 2016-130756

(51) Int. Cl.
| G05D 1/00 | (2006.01) |
|---|---|
| G05D 1/02 | (2006.01) |
| B63B 45/00 | (2006.01) |
| B63H 11/02 | (2006.01) |
| B63H 11/11 | (2006.01) |
| B63H 25/04 | (2006.01) |
| B63H 25/42 | (2006.01) |
| B63H 25/46 | (2006.01) |
| B63H 21/21 | (2006.01) |
| B63H 11/00 | (2006.01) |
| B63H 25/02 | (2006.01) |

(52) U.S. Cl.
CPC .......... *G05D 1/0206* (2013.01); *B63B 45/00* (2013.01); *B63H 11/02* (2013.01); *B63H 11/11* (2013.01); *B63H 21/21* (2013.01); *B63H 25/04* (2013.01); *B63H 25/42* (2013.01); *B63H 25/46* (2013.01); *G05D 1/0011* (2013.01); *B63H 2011/008* (2013.01); *B63H 2021/216* (2013.01); *B63H 2025/026* (2013.01); *B63H 2025/028* (2013.01)

(58) Field of Classification Search
CPC .... G05D 1/0206; G05D 1/0011; B63B 45/00; B63H 11/02; B63H 11/11; B63H 21/21; B63H 25/04; B63H 25/42; B63H 25/46
See application file for complete search history.

(56) References Cited

U.S. PATENT DOCUMENTS

| 6,273,771 B1 * | 8/2001 | Buckley ............... B63H 21/213 |
|---|---|---|
| | | 114/144 RE |
| 8,622,778 B2 * | 1/2014 | Tyers .................... B63H 21/21 |
| | | 114/144 B |

(Continued)

FOREIGN PATENT DOCUMENTS

JP    2011-128943 A    6/2011

*Primary Examiner* — Behrang Badii
*Assistant Examiner* — Daniel L Greene
(74) *Attorney, Agent, or Firm* — Keating and Bennett, LLP

(57) ABSTRACT

A marine vessel includes a distance detector that measures a distance to an object, a speed detector that detects a vessel speed, and a controller that executes on-shore/off-shore assistance control to control a propulsion unit to generate a thrust that moves a vessel body in a direction opposite to a direction toward the object based on the distance to the object measured by the distance detector and the vessel speed detected by the speed detector.

19 Claims, 13 Drawing Sheets

(56) References Cited

U.S. PATENT DOCUMENTS

| | | | | |
|---|---|---|---|---|
| 2007/0113769 A1* | 5/2007 | Stallings | ............... | B63H 21/213 114/144 R |
| 2010/0023192 A1* | 1/2010 | Rae | ...................... | B63H 11/107 701/21 |
| 2011/0022316 A1* | 1/2011 | Bendito Vallori | ..... | B63H 21/22 701/301 |
| 2012/0129410 A1* | 5/2012 | Tyers | ...................... | B63H 21/21 440/1 |
| 2013/0080044 A1* | 3/2013 | Tyers | ...................... | B63H 21/21 701/301 |
| 2015/0346722 A1* | 12/2015 | Herz | .................... | G05D 1/0038 701/2 |
| 2017/0253314 A1* | 9/2017 | Ward | ..................... | B63H 25/42 |

* cited by examiner

FIG.7 ON-SHORE ASSISTANCE CONTROL FLOW

FIG.12 ON-SHORE ASSISTANCE CONTROL FLOW

MARINE VESSEL

CROSS-REFERENCE TO RELATED APPLICATION

This application claims priority to Patent Application No. 2016-130756 filed in Japan on Jun. 30, 2016, the entire contents of which are herein incorporated by reference.

BACKGROUND OF THE INVENTION

1. Field of the Invention

The present invention relates to a marine vessel.

2. Description of the Related Art

Advanced techniques are required to dock a marine vessel smoothly, and it is not easy for a person other than a skilled person to dock the marine vessel smoothly. Thus, a device to support docking of a marine vessel is known in general. A docking support device for a marine vessel that enters a specified harbor is disclosed in Japanese Patent Laid-Open No. 2011-128943, for example.

This docking support device includes a recorder that records a track to a docking target position from when the marine vessel enters the harbor, and instructs an operator to operate the marine vessel along this track at the time of docking. Specifically, when an approach range is determined based on this track and the position of the marine vessel is out of this approach range at the time of docking, an instruction to the operator to return to a final approach starting point is output from the docking support device.

However, the docking support device as described above can be used only in the specified harbor for which the track is recorded in the recorder. Even if the marine vessel can be moved without being out of the approach range, it is not easy to operate the marine vessel near the shore, and advanced techniques for operating the marine vessel are required for the operator to dock the marine vessel smoothly. Even at the time of moving away from the shore, it may not be easy to operate the marine vessel to move the marine vessel away from the shore while avoiding an obstacle when the obstacle is near the marine vessel, for example.

SUMMARY OF THE INVENTION

Preferred embodiments of the present invention provide a marine vessel that is easily docked and moved away from the shore even in an unspecified harbor.

A marine vessel according to a preferred embodiment of the present invention includes a vessel body, an engine located on the vessel body, a propulsion unit that is driven by the engine and generates a thrust that moves the vessel body, a distance detector that measures a distance to an object, a speed detector that detects a vessel speed, and a controller configured or programmed to execute on-shore/off-shore assistance control to control the propulsion unit to generate a thrust that moves the vessel body in a direction opposite to a direction toward the object based on the distance to the object measured by the distance detector and the vessel speed detected by the speed detector.

A marine vessel according to a preferred embodiment of the present invention includes the controller configured or programmed to execute the on-shore/off-shore assistance control to control the propulsion unit to generate the thrust that moves the vessel body in the direction opposite to the direction toward the object based on the distance to the object measured by the distance detector and the vessel speed detected by the speed detector. Thus, the vessel speed is reduced as the vessel body moves toward a shore or a dock, which is the object, and hence the marine vessel is easily docked at the time of docking. At the time of docking and moving away from the shore, the marine vessel is moved in the direction opposite to the direction toward the object when the vessel body becomes too close to the shore, another marine vessel, or the like, which is the object, and hence collision of the vessel body against the object is prevented. Consequently, operating the marine vessel near the object, which is not easy, is assisted by the controller, and hence a vessel operator easily docks the marine vessel and moves the marine vessel away from the shore even in an unspecified harbor.

In a marine vessel according to a preferred embodiment of the present invention, the propulsion unit preferably includes a jet propulsion unit that moves the vessel body in a forward-rearward direction. In this case, the controller is preferably configured or programmed to control the jet propulsion unit to generate, in the forward-rearward direction, the thrust that moves the vessel body in the direction opposite to the direction toward the object in the on-shore assistance control. Accordingly, as the vessel body is moved toward the object in the forward-rearward direction by the jet propulsion unit, the vessel speed in the forward-rearward direction is reduced, and hence the marine vessel is easily docked at the time of docking.

In a marine vessel according to a preferred embodiment of the present invention, the propulsion unit preferably includes a side thruster that moves the vessel body in a right-left direction. In this case, the controller preferably controls the side thruster to generate, in the right-left direction, the thrust that moves the vessel body in the direction opposite to the direction toward the object in the on-shore assistance control. Accordingly, as the vessel body is moved toward the object in the right-left direction by the side thruster, the vessel speed in the right-left direction is reduced, and hence the marine vessel is easily docked at the time of docking.

A marine vessel according to a preferred embodiment of the present invention preferably further includes an alarm that provides a warning when the vessel speed is equal to or more than a predetermined speed when the vessel body enters a predetermined range from the object in the on-shore assistance control executed by the controller. Accordingly, when the vessel body is near the object and the vessel speed is high, the vessel operator is notified by the warning that it is necessary to operate the marine vessel carefully.

In this case, the controller is preferably configured or programmed to control the propulsion unit to generate the thrust that moves the vessel body in the direction opposite to the direction toward the object when the vessel body is not reduced in speed after the warning. Accordingly, when the vessel operator does not operate the marine vessel properly even after the vessel operator is notified that it is necessary to operate the marine vessel carefully, the controller instructs the propulsion unit to generate a thrust that moves the vessel body in the direction opposite to the direction toward the object such that collision of the vessel body against the object caused by an insufficient reduction in vessel speed is automatically prevented.

In the structure in which the warning is provided, the controller is preferably configured or programmed to control the propulsion unit to reduce or prevent generation of a thrust that moves the vessel body in the direction toward the object when the vessel body is not reduced in speed after the warning. Accordingly, when the vessel operator does not operate the marine vessel properly even after the vessel operator is notified that it is necessary to operate the marine vessel carefully, the controller reduces or prevents generation of the thrust that moves the vessel body in the direction toward the object such that collision of the vessel body against the object caused by an insufficient reduction in vessel speed is automatically prevented.

In this case, the controller is preferably configured or programmed to limit an upper value of a throttle opening degree of the engine to reduce or prevent generation of the thrust that moves the vessel body in the direction toward to the object. Accordingly, generation of the thrust that moves the vessel body in the direction toward the object is easily reduced or prevented.

In a marine vessel according to a preferred embodiment of the present invention, the controller is preferably configured or programmed to change, in stages, a magnitude of the thrust that moves the vessel body in the direction opposite to the direction toward the object based on the distance to the object and the vessel speed. Accordingly, in the case of high urgency such as when the distance to the object is short and the vessel speed is high, the thrust that moves the vessel body in the direction opposite to the direction toward the object is increased such that collision of the vessel body against the object is reliably prevented. On the other hand, in the case of low urgency such as when the distance to the object is long or the vessel speed is low, the thrust that moves the vessel body in the direction opposite to the direction toward the object is reduced such that causing the vessel operator discomfort associated with a change in thrust is significantly reduced or prevented.

In a marine vessel according to a preferred embodiment of the present invention, the controller is preferably configured or programmed to determine whether or not the marine vessel is docking or moving away from a shore, and to execute the on-shore/off-shore assistance control when determining that the marine vessel is docking or moving away from the shore. Accordingly, execution of the on-shore/off-shore assistance control in the marine vessel is significantly reduced or prevented when the marine vessel is not docking or moving away from the shore.

In this case, a marine vessel according to a preferred embodiment of the present invention preferably further includes a steering operator on which a vessel operator performs a steering operation, a control lever that allows the vessel operator to switch a shift state of the propulsion unit and a throttle opening degree of the engine, and a switch on which the vessel operator performs an input operation of docking or moving away from the shore such that the controller determines that the marine vessel is docking or moving away from the shore, and the switch is preferably located on the steering operator or is located on a side on which the control lever is located relative to the steering operator. Accordingly, when the switch is located on the steering operator, the vessel operator is able to perform the input operation of docking or moving away from the shore without taking his or her hands off the steering operator. Furthermore, when the switch is located on the side on which the control lever is located relative to the steering operator, the vessel operator is able to perform the input operation of docking or moving away from the shore on a side on which the vessel operator takes his or her hand off the steering operator when operating the control lever. Consequently, it is not necessary for the vessel operator to completely take his or her hands off the steering operator when the vessel operator performs the input operation, and hence the vessel operator continues to hold the steering operator. Consequently, even in a state where the vessel body is turned, the vessel operator is able to perform the input operation of docking or moving away from the shore.

The structure in which the controller determines whether or not the marine vessel is docking or moving away from the shore preferably further includes a first wireless remote that includes a wireless operator on which a vessel operator performs an input operation of docking or moving away from the shore, and wirelessly transmits operation information based on the input operation, and a first wireless receiver that is located on the vessel body and wirelessly receives the operation information from the first wireless remote, and the controller is preferably configured or programmed to determine that the marine vessel is docking or moving away from the shore based on the operation information received through the first wireless receiver. Accordingly, the vessel operator performs the input operation on the first wireless remote such that it is not necessary for the vessel operator to completely take his or her hands off the steering operator, and hence the vessel operator continues to hold the steering operator. Consequently, even in a state where the vessel body is turned, the vessel operator is able to perform the operation of docking or moving away from the shore.

In a marine vessel according to a preferred embodiment of the present invention, the propulsion unit preferably includes a plurality of propulsion units, and the controller is preferably configured or programmed to control, independently of each other, directions in which thrusts of the plurality of propulsion units are generated. Accordingly, the marine vessel is able to easily perform a turning movement operation, a forward and rearward movement operation, a right-left translation movement operation, a turning round operation, etc., and hence the controller controls the movement of the marine vessel more carefully in the on-shore/off-shore assistance control.

In a marine vessel according to a preferred embodiment of the present invention, the controller is preferably configured or programmed to execute the on-shore/off-shore assistance control based on a turning angular velocity of the vessel body. Accordingly, the controller properly controls the orientation of the marine vessel in the on-shore/off-shore assistance control.

In a marine vessel according to a preferred embodiment of the present invention, the controller is preferably configured or programmed to acquire the thrust of the propulsion unit based on at least one of an engine rotational speed and a propeller rotational speed, and executes the on-shore/off-shore assistance control based on the acquired thrust of the propulsion unit. Accordingly, the controller controls a thrust to be output from the propulsion unit after this based on the acquired thrust of the propulsion unit, and hence the propulsion unit is more accurately controlled.

A marine vessel according to a preferred embodiment of the present invention preferably further includes a second wireless remote that includes a positional information acquirer and wirelessly transmits positional information acquired by the positional information acquirer, and a second wireless receiver that is located on the vessel body and wirelessly receives the positional information from the second wireless remote, and the controller is preferably configured or programmed to set a target docking position for the vessel body based on the positional information received through the second wireless receiver, and to execute the on-shore assistance control to dock the vessel body at the target docking position. Accordingly, in the on-shore assistance control, the controller reliably docks the vessel body at the target docking position based on the positional information.

A marine vessel according to a preferred embodiment of the present invention preferably further includes a control lever that allows a vessel operator to switch a shift state of the propulsion unit and a throttle opening degree of the engine, and the controller preferably starts the on-shore/off-shore assistance control when the control lever is operated such that the shift state of the propulsion unit is a neutral state and the throttle opening degree of the engine is an idling opening degree. Accordingly, the on-shore/off-shore assistance control is started in a state where the thrust of the propulsion unit is not substantially generated, and hence the on-shore/off-shore assistance control is properly started.

In a marine vessel according to a preferred embodiment of the present invention, the controller preferably starts the on-shore/off-shore assistance control when a determination parameter of at least one of the vessel speed, an acceleration of the vessel body, a turning angular velocity of the vessel body, a turning angular acceleration of the vessel body, an engine rotational speed, and the thrust of the propulsion unit is equal to or less than a first threshold. Accordingly, starting of the on-shore/off-shore assistance control from a state where the vessel speed and so on are high is significantly reduced or prevented, and hence the on-shore/off-shore assistance control is easily started even on water in which a large inertia is likely to occur and it is difficult to quickly turn the vessel body, for example.

In this case, the controller preferably stops execution of the on-shore/off-shore assistance control when the determination parameter is equal to or more than a second threshold during execution of the on-shore/off-shore assistance control. Accordingly, continuation of the on-shore/off-shore assistance control is significantly reduced or prevented when the on-shore/off-shore assistance control is not properly executed due to a large determination parameter value. Furthermore, when the vessel operator operates the marine vessel such that the determination parameter value is increased, for example, execution of the on-shore/off-shore assistance control is stopped, and the marine vessel is restored to a normal state. Thus, the vessel operator is able to restore the control state of the marine vessel to the normal state (a state where the on-shore/off-shore assistance control is not executed) without performing a special operation.

The above and other elements, features, steps, characteristics and advantages of preferred embodiments of the present invention will become more apparent from the following detailed description of the preferred embodiments with reference to the attached drawings.

DETAILED DESCRIPTION OF THE PREFERRED EMBODIMENTS

Preferred embodiments of the present invention are hereinafter described with reference to the drawings.

First Preferred Embodiment

The structure of a marine vessel 1 according to a first preferred embodiment of the present invention is now described with reference to FIGS. 1 to 6. In the figures, arrow FWD represents the forward movement direction (bow direction) of the marine vessel 1, and arrow BWD represents the reverse movement direction (stern direction) of the marine vessel 1. A forward-rearward direction including the forward movement direction and the reverse movement direction is the same as the longitudinal direction of the marine vessel 1. In the figures, arrow R represents the starboard direction (one direction in the width direction) of the marine vessel 1, and arrow L represents the portside direction (the other direction in the width direction) of the marine vessel 1. In the figures, arrow Z represents a vertical direction.

Figure 1:
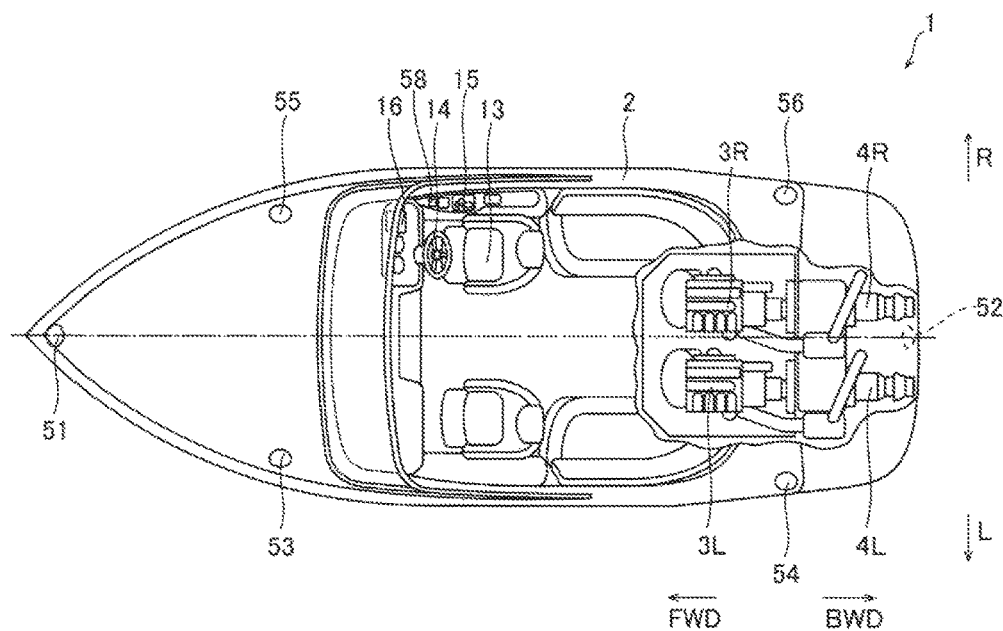
FIG. 1 is a plan view of a marine vessel according to a first preferred embodiment of the present invention.
Figure 2:
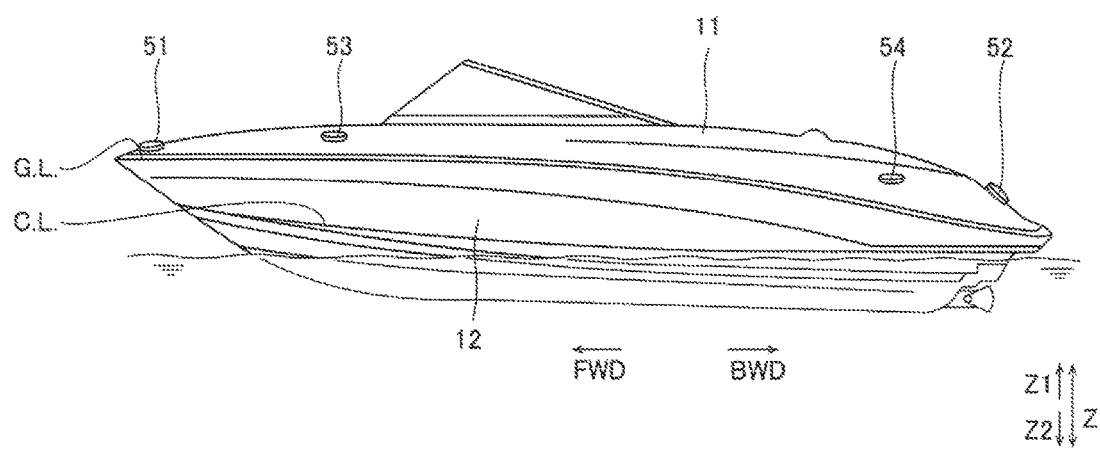
FIG. 2 is a side elevational view of the marine vessel according to the first preferred embodiment of the present invention.

The marine vessel 1 is, for example, a jet propelled boat, and may be of the type called a jet boat or a sport boat. The marine vessel 1 includes a vessel body 2, engines 3L and 3R, and jet propulsion units 4L and 4R, as shown in FIGS. 1 and 2. The jet propulsion units 4L and 4R are examples of a "propulsion unit".

The vessel body 2 includes a deck 11 and a hull 12. The hull 12 is located vertically below (direction Z2) the deck 11. A gunwale line (G.L.) is located on a boundary between the deck 11 and the hull 12 in the vessel body 2. A draft line is located on a chine line (C.L.) in the vessel body 2 when the marine vessel 1 is anchored.

As shown in FIG. 1, the deck 11 includes a vessel operator's seat 13, a steering operator 14, and a remote control 15. The steering operator 14 is located in front of (FWD side) the vessel operator's seat 13. The steering operator 14 is operated by a vessel operator to steer the vessel body 2. The remote control 15 is located on a starboard side (R side) relative to the vessel operator's seat 13. The remote control 15 is operated by the vessel operator to adjust the outputs of the engines 3L and 3R and switch between forward movement and reverse movement.

The deck 11 includes a touch panel 16. The touch panel 16 is located in front of the vessel operator's seat 13. Information about the marine vessel 1 is displayed on the touch panel 16.

The engines 3L and 3R are housed in the vessel body 2. An output shaft of the engine 3L is connected to the jet propulsion unit 4L. An output shaft of the engine 3R is connected to the jet propulsion unit 4R. The jet propulsion unit 4L is driven by the engine 3L, and generates a thrust that moves the vessel body. The jet propulsion unit 4R is driven by the engine 3R, and generates a thrust that moves the vessel body. The jet propulsion units 4L and 4R are aligned in a right-left direction.

Figure 3:
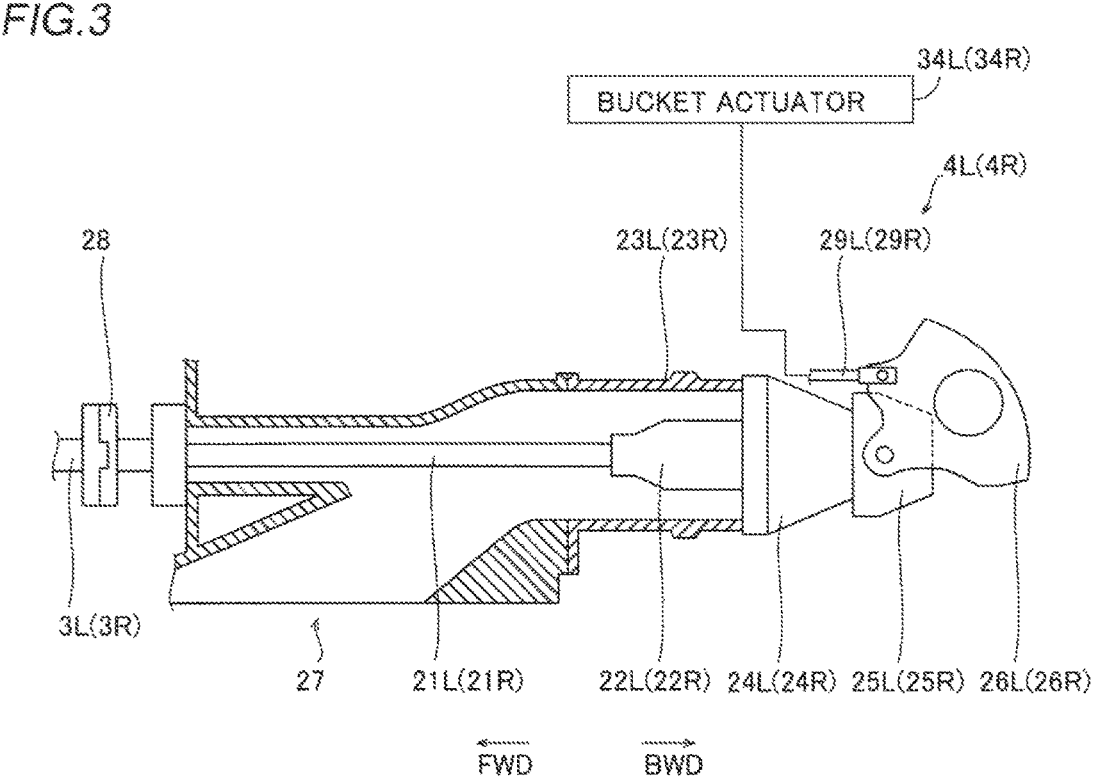
FIG. 3 is a sectional view showing the structure of a jet propulsion unit according to the first preferred embodiment of the present invention.

The jet propulsion unit 4L sucks in and jets water around the vessel body 2 to generate a thrust. As shown in FIG. 3, the jet propulsion unit 4L includes an impeller shaft 21L, an impeller 22L, an impeller housing 23L, a nozzle 24L, a deflector 25L, and a reverse bucket 26L.

The impeller shaft 21L extends in the forward-rearward direction. A forward portion of the impeller shaft 21L is connected to the output shaft of the engine 3L through a coupling 28. A rearward portion of the impeller shaft 21L is located inside the impeller housing 23L. The impeller housing 23L is located behind (BWD side) a water intake 27. The nozzle 24L is located behind the impeller housing 23L.

The impeller 22L is mounted on a rearward portion of the impeller shaft 21L. The impeller 22L is located inside the impeller housing 23L. The impeller 22L rotates together with the impeller shaft 21L, sucks in water through the water intake 27, and jets the sucked in water rearward from the nozzle 24L.

The deflector 25L is located behind the nozzle 24L. The reverse bucket 26L is located behind the deflector 25L. The deflector 25L changes the direction of the water jetted from the nozzle 24L to the right-left direction.

The reverse bucket 26L is switchable between a forward movement position and a reverse movement position. In a state where the reverse bucket 26L is at the forward movement position, the water from the nozzle 24L and the deflector 25L is jetted rearward. Thus, the jet propulsion unit 4L generates a thrust in the forward movement direction. In a state where the reverse bucket 26L is at the reverse movement position, the water from the nozzle 24L and the deflector 25L is jetted forward. Thus, the jet propulsion unit 4L generates a thrust in the reverse movement direction.

The jet propulsion unit 4R includes an impeller shaft 21R, an impeller 22R, an impeller housing 23R, a nozzle 24R, a deflector 25R, and a reverse bucket 26R. The structure of the jet propulsion unit 4R is similar to that of the jet propulsion unit 4L, and hence the detailed description is omitted.

A vessel steering mechanism and a control system of the marine vessel 1 is now described.

Figure 4:
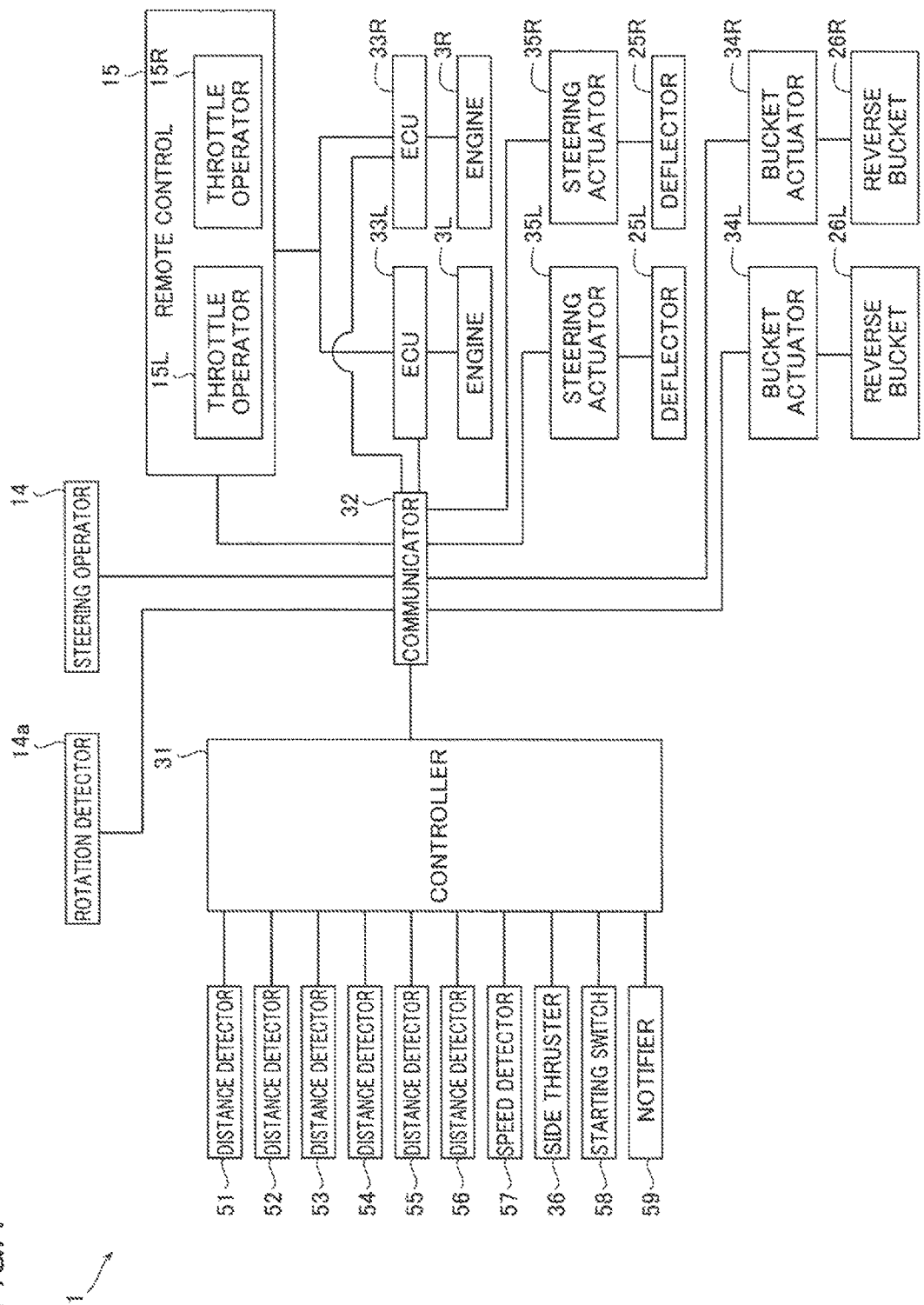
FIG. 4 is a block diagram of the marine vessel according to the first preferred embodiment of the present invention.

As shown in FIG. 4, the marine vessel 1 includes a controller 31. The controller 31 includes an arithmetic unit such as a CPU and memories such as a RAM and a ROM, and is configured or programmed to control the entire marine vessel 1. The marine vessel 1 includes a communicator 32 that performs wired communication.

The marine vessel 1 includes a rotation detector 14a that detects a rotation angle about a rotation axis that extends along a direction in which a helm of the steering operator 14 extends. The steering operator 14 and the rotation detector 14a communicate with the controller 31 through the communicator 32.

The remote control 15 includes a lever that receives an operation from the vessel operator, and includes throttle operators 15L and 15R. The throttle operator 15L detects the shift state (the forward movement state, reverse movement state, or neutral state) of the jet propulsion unit 4L and the operation amount of the throttle opening degree of the engine 3L. The throttle operator 15R detects the shift state (the forward movement state, reverse movement state, or neutral state) of the jet propulsion unit 4R and the operation amount of the throttle opening degree of the engine 3R. The remote control 15 is an example of a "control lever".

The marine vessel 1 includes an ECU (engine control unit) 33L and an ECU 33R. The ECU 33L controls the engine 3L. The ECU 33R controls the engine 3R. The controller 31 is in data communication with the ECUs 33L and 33R through the communicator 32. The remote control 15 is in wired communication with the ECUs 33L and 33R.

The remote control 15 transmits operation amount information that indicates the operation amount of the throttle operator 15L to the ECU 33L. The remote control 15 transmits operation amount information that indicates the operation amount of the throttle operator 15R to the ECU 33R. The ECU 33L controls the rotational speed of the engine 3L according to the operation amount of the throttle operator 15L. The ECU 33R controls the rotational speed of the engine 3R according to the operation amount of the throttle operator 15R.

The marine vessel 1 includes bucket actuators 34L and 34R. The bucket actuator 34L is connected to the reverse bucket 26L of the jet propulsion unit 4L through a connector 29L, as shown in FIG. 4. The bucket actuator 34R is connected to the reverse bucket 26R of the jet propulsion unit 4R through a connector 29R. The bucket actuators 34L and 34R switch the position of the reverse bucket 26L and the position of the reverse bucket 26R to a forward movement position, a reverse movement position, or a neutral position, respectively. The bucket actuators 34L and 34R include electric motors, for example, and are controlled by the controller 31 according to the operation of the remote control 15. Thus, the shift states of the jet propulsion units 4L and 4R are changed to the forward movement state, the reverse movement state, or the neutral state (a state where neither forward movement nor reverse movement is performed).

As shown in FIG. 4, the marine vessel 1 includes a steering actuator (S/T actuator) 35L and a steering actuator 35R. The steering actuator 35L is connected to the deflector 25L of the jet propulsion unit 4L. The steering actuator 35R is connected to the deflector 25R of the jet propulsion unit 4R. The steering actuators 35L and 35R change the direction of the deflector 25L and the direction of the deflector 25R, respectively. The steering actuators 35L and 35R include electric motors, for example, and are controlled independently of each other by the controller 31 according to the operation of the steering operator 14. Consequently, directions in which the thrusts of the jet propulsion units 4L and 4R are generated are controlled independently of each other by the controller 31.

The marine vessel 1 includes a side thruster 36 that moves the vessel body 2 in the right-left direction. The side thruster 36 is controlled by the controller 31. The side thruster 36 is an example of a "propulsion unit".

The marine vessel 1 includes a distance detector 51, a distance detector 52, a distance detector 53, a distance detector 54, a distance detector 55, and a distance detector 56. The distance detectors 51 to 56 are millimeter-wave radars, for example, and detect a distance to an object T (see FIG. 5). The object T is a dock, a pier, or another marine vessel that is anchored, for example. The distance detectors 51 to 56 are not restricted to millimeter-wave radars, but may be another type of distance measuring device. The distance detectors 51 to 56 may be cameras, for example, and may calculate the distance to the object T by image processing.

Figure 5:
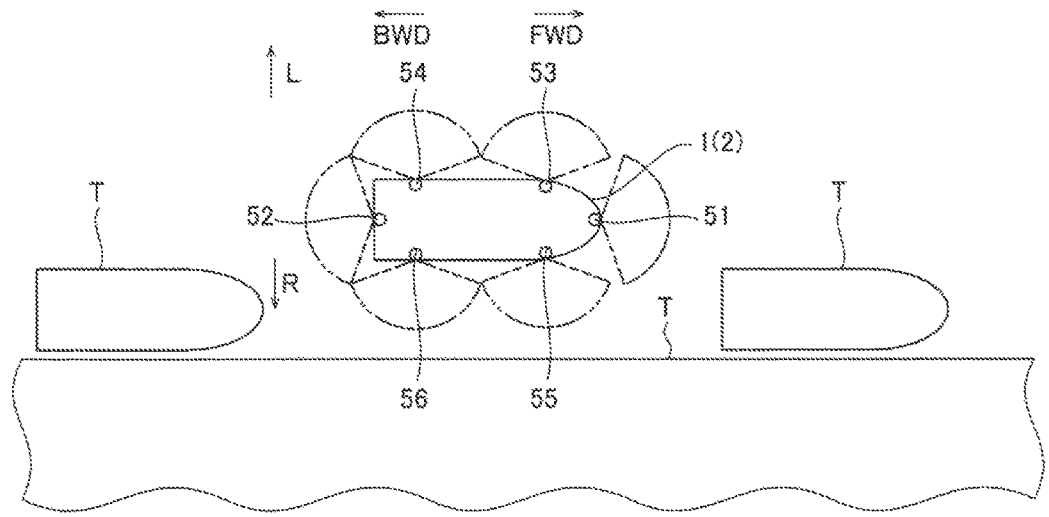
FIG. 5 is a plan view schematically showing an arrangement of distance detectors of the marine vessel according to the first preferred embodiment of the present invention.

As shown in FIG. 5, the distance detector 51 is mounted on a forward and substantially central portion of the vessel body 2 in the width direction, and detects the presence or absence of the object T in front of the vessel body 2 and the distance to the object T located in front of the vessel body 2. The distance detector 52 is mounted on a rearward and substantially central portion of the vessel body 2 in the width direction, and detects the presence or absence of the object T behind the vessel body 2 and the distance to the object T located behind the vessel body 2.

The distance detector 53 is mounted on a portside and forward portion of the vessel body 2, and detects the presence or absence of the object T on a forward portside relative to the vessel body 2 and the distance to the object T located on the forward portside relative to the vessel body 2. The distance detector 54 is mounted on a portside and rearward portion of the vessel body 2, and detects the presence or absence of the object T on a rearward portside relative to the vessel body 2 and the distance to the object T located on the rearward portside relative to the vessel body 2.

The distance detector 55 is mounted on a starboard and forward portion of the vessel body 2, and detects the presence or absence of the object T on a forward starboard side relative to the vessel body 2 and the distance to the object T located on the forward starboard side relative to the vessel body 2. The distance detector 56 is mounted on a starboard and rearward portion of the vessel body 2, and detects the presence or absence of the object T on a rearward starboard side relative to the vessel body 2 and the distance to the object T located on the rearward starboard side relative to the vessel body 2. In FIG. 5, the detection ranges of the distance detectors 51 to 56 are shown by two-dot chain lines. The distance detectors 51 to 56 each transmit the detected information to the controller 31.

On the portside portion of the marine vessel 1 shown in FIG. 2, all the distance detectors 51 to 54 are located vertically above (direction Z1) the chine line (C.L.) of the vessel body 2. The outer shape of the marine vessel 1 is substantially bilaterally symmetric, and hence illustration of the starboard portion of the marine vessel 1 is omitted. Both the distance detectors 55 and 56 are located vertically above the chine line (C.L.) of the vessel body 2. Thus, the possibility that the distance detectors 51 to 56 are exposed to water is significantly reduced or prevented, and hence a reduction in the measurement accuracy of the distance detectors 51 to 56 caused by water, extraneous material, etc. is significantly reduced or prevented.

As shown in FIG. 4, the marine vessel 1 includes a speed detector 57 that detects a vessel speed. The speed detector 57 detects the position, moving direction, and vessel speed of the marine vessel 1 with, for example, a GNSS (global navigation satellite system) such as a GPS (global positioning system). The speed detector 57 detects the vessel speed of the marine vessel 1 in each of the front, back, right, and left directions and a turning angular velocity (turning round angular velocity). The speed detector 57 transmits the detected information to the controller 31.

Figure 6:
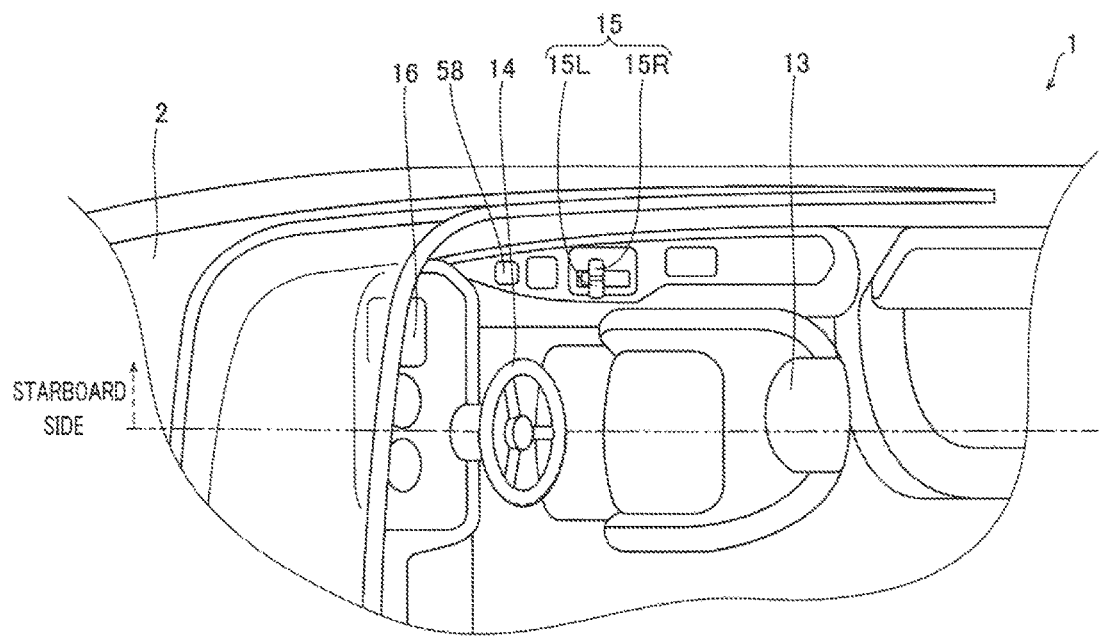
FIG. 6 is an enlarged plan view showing an area around an operator's seat of the marine vessel according to the first preferred embodiment of the present invention.

The marine vessel 1 includes a starting switch 58. The vessel operator operates the starting switch 58 to switch on or off an on-shore/off-shore assistance function. The on-shore/off-shore assistance function is a function of assisting the vessel operator by giving a warning according to the distance to the object T around the vessel body 2 or automatically controlling the vessel body 2 at the time of docking and at the time of moving away from the shore. The starting switch 58 is located in front of the remote control 15 near the steering operator 14, as shown in FIG. 6. In other words, the starting switch 58 is located on a side (starboard side) on which the remote control 15 is located relative to the steering operator 14. The starting switch 58 is an example of an "operator".

A switch including the starting switch 58 is preferably located on the side (starboard side) on which the remote control 15 is located relative to the steering operator 14. When the switch that switches on or off the on-shore/off-shore assistance function is located on the touch panel 16, for example, the switch that switches on or off the on-shore/off-shore assistance function is preferably located on a portion of the touch panel 16 on the side on which the remote control 15 is located relative to the steering operator 14. The switch including the starting switch 58 may be mounted on the steering operator 14 or the remote control 15. In other words, the switch is preferably located on the steering operator 14 or near the steering operator 14 on a starboard side relative to a two-dot chain line in FIG. 6. Thus, the possibility that the vessel operator completely takes his or her hands off the steering operator 14 is significantly reduced or prevented. A starting switch for an assistance function at the time of docking and a starting switch for an assistance function at the time of moving away from the shore may be provided separately from each other.

The switch (starting switch) may be located below the steering operator 14 such that the vessel operator that sits on the vessel operator's seat 13 operates the switch with his or her foot. Thus, the possibility that the vessel operator completely takes his or her hands off the steering operator 14 is significantly reduced or prevented.

The marine vessel 1 includes a notifier 59, as shown in FIG. 4. The notifier 59 announces starting and stopping of the on-shore/off-shore assistance function and provides a warning in the on-shore/off-shore assistance function. The notifier 59 includes a buzzer or a speaker, for example, and makes an audio announcement. The notifier 59 may make an announcement by lighting or blinking of a warning light, or may make an announcement by display of characters or figures on the touch panel 16, for example. The notifier 59 may announce that the marine vessel 1 is being controlled by the on-shore/off-shore assistance function based on sound, lighting, and display different from the warning of the on-shore/off-shore assistance function. The notifier 59 and the touch panel 16 is an example of an "alarm".

On-shore/off-shore assistance control is now described in detail. According to the first preferred embodiment, the marine vessel 1 includes the assistance function at the time of docking and the assistance function at the time of moving away from the shore, and the controller 31 executes on-shore/off-shore assistance control.

Figure 7:
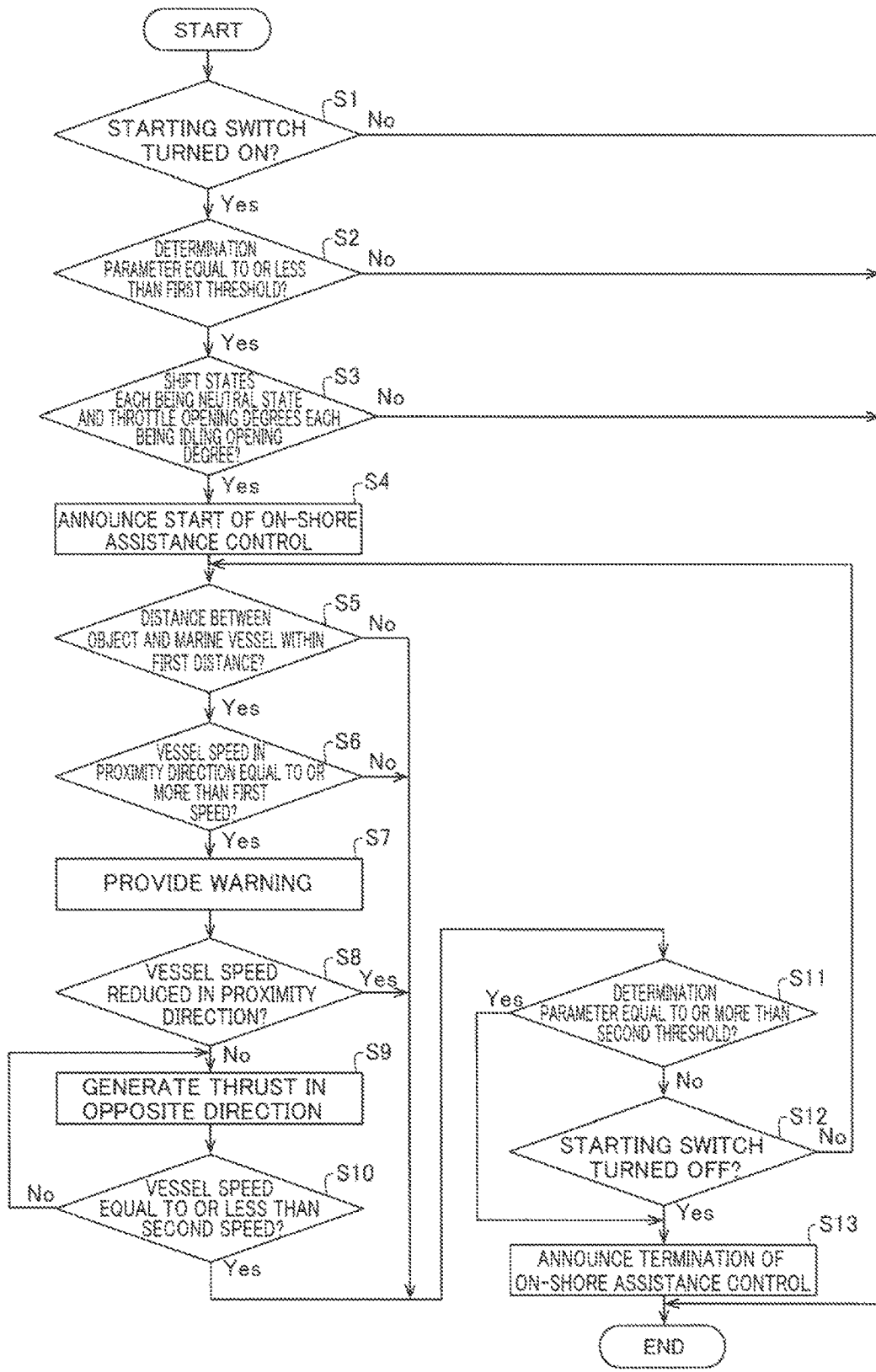
FIG. 7 is a flowchart showing a process for on-shore assistance control in the marine vessel according to the first preferred embodiment of the present invention.

The on-shore assistance control executed by the controller 31 is now described with reference to FIG. 7. First, the controller 31 determines whether or not the starting switch 58 is on in step S1. When the starting switch 58 is not on, the controller 31 does not execute the on-shore assistance control. When the starting switch 58 is on, the controller 31 determines whether or not a determination parameter is equal to or less than a first threshold in step S2. Specifically, the controller 31 determines whether or not the vessel speed detected by the speed detector 57 is equal to or less than a first speed threshold set in advance and the turning angular velocity detected by the speed detector 57 is equal to or less than a first turning angular velocity threshold set in advance. When the determination parameter is not equal to or less than the first threshold (when the vessel speed is not equal to or less than the first speed threshold or when the turning angular velocity is not equal to or less than the first turning angular velocity threshold), the controller 31 does not execute the on-shore assistance control.

When the determination parameter is equal to or less than the first threshold, the controller 31 determines whether or not the remote control 15 is operated such that the shift states of the jet propulsion units 4L and 4R each are a neutral state and the throttle opening degrees of the engines 3L and 3R each are an idling opening degree in step S3. When the remote control 15 is operated such that the shift states each are not the neutral state or the throttle opening degrees each are not the idling opening degree, the controller 31 does not execute the on-shore assistance control. When the remote control 15 is operated such that the shift states each are the neutral state and the throttle opening degrees each are the idling opening degree, the controller 31 controls the notifier 59 to announce that the on-shore assistance control is started in step S4. Consequently, when the remote control 15 is operated such that the determination parameter is equal to or less than the first threshold, the shift states of the jet propulsion units 4L and 4R each are the neutral state, and the throttle opening degrees of the engines 3L and 3R each are the idling opening degree, the controller 31 determines that the marine vessel 1 is docking. Then, the controller 31 executes the on-shore assistance control.

The controller 31 determines whether or not the distance between the object T and the vessel body 2 is within a first distance in step S5. Specifically, the controller 31 determines whether or not each of the distance to the object T located in front of the vessel body 2 detected by the distance detector 51, the distance to the object T located behind the vessel body 2 detected by the distance detector 52, the distance to the object T located on the portside relative to the vessel body 2 detected by the distance detectors 53 and 54, and the distance to the object T located on the starboard side relative to the vessel body 2 detected by the distance detectors 55 and 56 is within the first distance. The first distance may be a different value for each position (front, back, portside, and starboard) relative to the vessel body 2.

When none of the distances between the object T and the vessel body 2 is within the first distance, the controller 31 advances to step S11 without generating a thrust in a direction opposite to a direction toward the object T.

When any of the distances between the object T and the vessel body 2 is within the first distance, the controller 31 determines whether or not the speed (vessel speed) of the vessel body 2 in a direction (proximity direction) in which the distance between the object T and the vessel body 2 is within the first distance is equal to or more than a first speed in step S6. When the distance between the object T and the vessel body 2 is within the first distance in a plurality of proximity directions, the controller 31 determines whether or not the vessel speed is equal to or more than the first speed in each of the plurality of proximity directions. When the vessel speed in the proximity direction is not equal to or more than the first speed (when the vessel speed is not equal to or more than the first speed in all of the plurality of proximity directions), the controller 31 advances to step S11 without generating a thrust in the direction opposite to the direction toward the object T.

When the vessel speed in the proximity direction is equal to or more than the first speed (when the vessel speed is equal to or more than the first speed in any of the plurality of proximity directions), the controller 31 controls the notifier 59 to provide a warning in step S7.

The controller 31 determines whether or not the vessel speed has been reduced in the proximity direction after the warning in step S8. When in the plurality of proximity directions, the distance between the object T and the vessel body 2 is within the first distance and the vessel speed is equal to or less than the first speed, the controller 31 determines whether or not the vessel speed has been reduced in each of the plurality of proximity directions.

When the vessel speed has been reduced in the proximity direction (the vessel speed has been reduced in all of the plurality of proximity directions), the controller 31 advances to step S11 without generating a thrust in the direction opposite to the direction toward the object T. When the vessel speed has not been reduced in the proximity direction (when the vessel speed has not been reduced in any of the plurality of proximity directions), the controller 31 generates a thrust in the direction opposite to the direction (proximity direction) toward the object T in step S9. In this case, based on the rotational speeds of the engines 3L and 3R, the vessel speed, the turning angular velocity of the vessel body 2, etc., the controller 31 controls the jet propulsion unit 4L (reverse bucket 26L), the jet propulsion unit 4R (reverse bucket 26R), the engines 3L and 3R, and the side thruster 36 to generate a thrust in the direction opposite to the direction toward the object T. When the vessel speed has not been reduced in the plurality of proximity directions, the controller 31 generates a thrust in the direction opposite to the direction (proximity direction) toward the object T in each of the plurality of proximity directions.

The controller 31 determines whether or not the vessel speed in the proximity direction is equal to or less than a second speed in step S10. The second speed may be the same value as the first speed or may be a different value from the first speed. When the controller 31 generates a thrust in the direction opposite to the direction (proximity direction) toward the object T in the plurality of proximity directions, the controller 31 determines whether or not the vessel speed is equal to or less than the second speed in each of the plurality of proximity directions. When the vessel speed in the proximity direction is not equal to or less than the second speed (when the vessel speed is not equal to or less than the second speed in any of the plurality of proximity directions), the controller 31 returns to step S9, and continues to generate a thrust in the direction opposite to the direction (proximity direction) toward the object T.

When the vessel speed in the proximity direction is equal to or less than the second speed (when the vessel speed is equal to or less than the second speed in all of the plurality of proximity directions), the controller 31 determines whether or not the determination parameter is equal to or more than a second threshold in step S11. Specifically, the controller 31 determines whether or not the vessel speed detected by the speed detector 57 is equal to or more than a second speed threshold set in advance and the turning angular velocity detected by the speed detector 57 is equal to or more than a second turning angular velocity threshold set in advance. The second speed threshold and the second turning angular velocity threshold may be the same value as the first speed threshold and the first turning angular velocity threshold or may be a different value from the first speed threshold and the first turning angular velocity threshold, respectively.

When the determination parameter is not equal to or more than the second threshold (when the vessel speed is not equal to or more than the second speed threshold and the turning angular velocity is not equal to or more than the second turning angular velocity threshold), the controller 31 determines whether or not the starting switch 58 is off in step S12. When the starting switch 58 is not off, the controller 31 returns to step S5, and continues the on-shore assistance control. The thrust in the direction opposite to the direction (proximity direction) toward the object T may be feedback controlled according to the vessel speed and the distance to the object T.

When the determination parameter is equal to or more than the second threshold (when the vessel speed is equal to or more than the second speed threshold and the turning angular velocity is equal to or more than the second turning angular velocity threshold) and the starting switch 58 is off, the controller 31 controls the notifier 59 to announce that the on-shore assistance control is terminated (stopped) in step S13, and terminates the on-shore assistance control.

Figure 8:
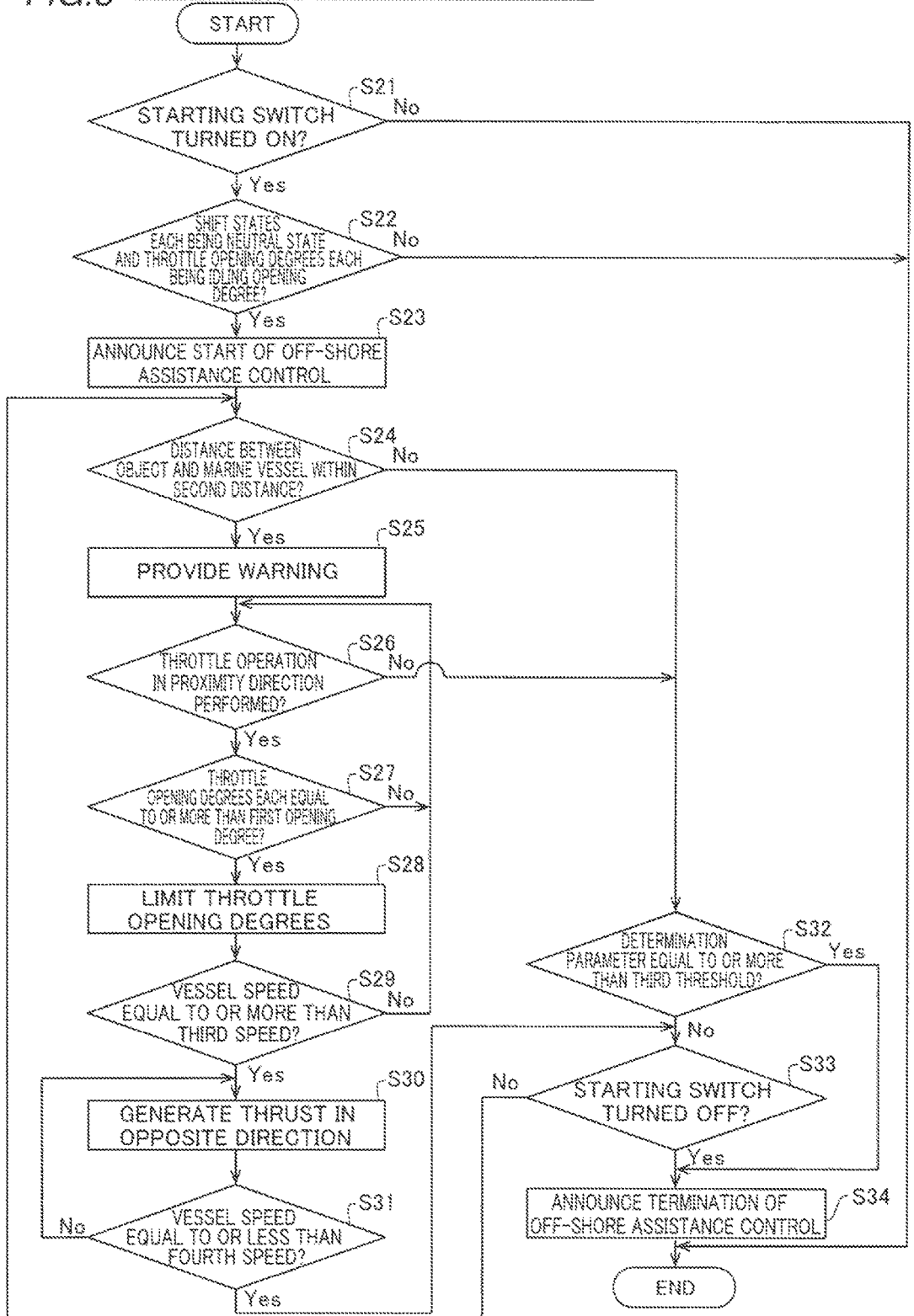
FIG. 8 is a flowchart showing a process for off-shore assistance control in the marine vessel according to the first preferred embodiment of the present invention.

The off-shore assistance control executed by the controller 31 is now described with reference to FIG. 8. In the off-shore assistance control, only assistance control in the forward movement direction and the reverse movement direction is executed, and assistance control in the right-left direction is not executed.

First, the controller 31 determines whether or not the starting switch 58 is on in step S21. When the starting switch 58 is not on, the controller 31 does not execute the off-shore assistance control. When the starting switch 58 is on, the controller 31 determines whether or not the remote control 15 is operated such that the shift states of the jet propulsion units 4L and 4R each are the neutral state and the throttle opening degrees of the engines 3L and 3R each are the idling opening degree in step S22, similarly to step S3. When the remote control 15 is operated such that the shift states each are not the neutral state or the throttle opening degrees each are not the idling opening degree, the controller 31 does not execute the off-shore assistance control. When the remote control 15 is operated such that the shift states each are the neutral state and the throttle opening degrees each are the idling opening degree, the controller 31 controls the notifier 59 to announce that the off-shore assistance control is started in step S23, similarly to step S4. Then, the controller 31 executes the off-shore assistance control.

The controller 31 determines whether or not the distance between the object T and the vessel body 2 is within a second distance in step S24, similarly to step S5. Specifically, the controller 31 determines whether or not each of the distance to the object T located in front of the vessel body 2 detected by the distance detector 51 and the distance to the object T located behind the vessel body 2 detected by the distance detector 52 is within the second distance. The second distance may be a different value for each position (front and back) relative to the vessel body 2.

When neither of the distances between the object T and the vessel body 2 is within the second distance, the controller 31 advances to step S32 without generating a thrust in the direction opposite to the direction toward the object T. When either of the distances between the object T and the vessel body 2 is within the second distance, the controller 31 controls the notifier 59 to provide a warning in step S25, similarly to step S7.

The controller 31 determines whether or not a throttle operation in a direction (proximity direction) in which the distance between the object T and the vessel body 2 is within the second distance has been performed in step S26. When the throttle operation in the proximity direction has not been performed (when the throttle operation has been performed in a direction opposite to the proximity direction or no throttle operation has been performed), the controller 31 advances to step S32 without generating a thrust in the direction opposite to the direction toward the object T, for example. When the throttle operation in the proximity direction has been performed, the controller 31 determines whether or not throttle opening degrees each are equal to or more than a first opening degree in step S27. The throttle opening degrees are determined based on the operation amount of the throttle operator 15L and the operation amount of the throttle operator 15R.

When the throttle opening degrees each are not equal to or more than the first opening degree, the controller 31 returns to step S26. When the throttle opening degrees each are equal to or more than the first opening degree, the controller 31 limits the throttle opening degrees in step S28. The controller 31 limits the upper values of the throttle opening degrees of the engines 3L and 3R to reduce or prevent a thrust in the direction toward the object T. Thus, the thrust in the direction toward the object T is reduced below a thrust that corresponds to the throttle opening degrees operated by the vessel operator.

The controller 31 determines whether or not the vessel speed in the proximity direction is equal to or more than a third speed in step S29. When the vessel speed in the proximity direction is not equal to or more than the third speed, the controller 31 returns to step S26. When the vessel speed in the proximity direction is equal to or more than the third speed, the controller 31 generates a thrust in the direction opposite to the direction (proximity direction) toward the object T in step S30, similarly to step S9.

The controller 31 determines whether or not the vessel speed in the proximity direction is equal to or less than a fourth speed in step S31. When the vessel speed in the proximity direction is not equal to or less than the fourth speed, the controller 31 returns to step S30, and continues to generate a thrust in the direction opposite to the proximity direction. When the vessel speed in the proximity direction is equal to or less than the fourth speed, the controller 31 advances to step S32.

The controller 31 determines whether or not the determination parameter is equal to or more than a third threshold in step S32. Specifically, the controller 31 determines whether or not the vessel speed detected by the speed detector 57 is equal to or more than a third speed threshold set in advance and the turning angular velocity detected by the speed detector 57 is equal to or more than a third turning angular velocity threshold set in advance.

When the determination parameter is not equal to or more than the third threshold (when the vessel speed is not equal to or more than the third speed threshold and the turning angular velocity is not equal to or more than the third turning angular velocity threshold), the controller 31 determines whether or not the starting switch 58 is off in step S33. When the starting switch 58 is not off, the controller 31 returns to step S24, and continues the off-shore assistance control. The thrust in the direction opposite to the direction (proximity direction) toward the object T may be feedback controlled according to the vessel speed and the distance to the object T.

When the determination parameter is equal to or more than the third threshold (when the vessel speed is equal to or more than the third speed threshold or the turning angular velocity is equal to or more than the third turning angular velocity threshold) and the starting switch 58 is off, the controller 31 controls the notifier 59 to announce that the off-shore assistance control is terminated in step S34, and terminates the off-shore assistance control.

According to the first preferred embodiment of the present invention, the following advantageous effects are obtained.

According to the first preferred embodiment of the present invention, the marine vessel 1 includes the controller that executes the on-shore/off-shore assistance control to control the propulsion unit to generate a thrust that moves the vessel body 2 in the direction (proximity direction) opposite to the direction toward the object T based on the distances to the object T measured by the distance detectors 51 to 56 and the vessel speed detected by the speed detector 57. Thus, the vessel speed is reduced as the vessel body 2 moves toward the shore or the dock, which is the object T, and hence the marine vessel 1 is easily docked at the time of docking. At the time of docking and moving away from the shore, the marine vessel 1 is moved in the direction opposite to the direction toward the object T when the vessel body 2 becomes too close to the shore, another marine vessel, or the like, which is the object T, and hence collision of the vessel body 2 against the object T is prevented. Consequently, operating the marine vessel near the object T, which is not easy, is assisted by the controller 31, and hence the vessel operator easily docks the marine vessel 1 and moves the marine vessel 1 away from the shore even in an unspecified harbor.

According to the first preferred embodiment of the present invention, the controller 31 controls the jet propulsion units 4L and 4R to generate, in the forward-rearward direction, the thrust that moves the vessel body 2 in the direction opposite to the direction toward the object T in the on-shore assistance control. Thus, as the vessel body 2 is moved toward the object T in the forward-rearward direction by the jet propulsion units 4L and 4R, the vessel speed in the forward-rearward direction is reduced, and hence the marine vessel 1 is easily docked at the time of docking.

According to the first preferred embodiment of the present invention, the controller 31 controls the side thruster 36 to generate, in the right-left direction, the thrust that moves the vessel body 2 in the direction opposite to the direction toward the object T in the on-shore assistance control. Accordingly, as the vessel body 2 is moved toward the object T in the right-left direction by the side thruster 36, the vessel speed in the right-left direction is reduced, and hence the marine vessel 1 is easily docked at the time of docking.

According to the first preferred embodiment of the present invention, the controller 31 determines whether or not the vessel speed is equal to or more than the first speed when the vessel body 2 enters a predetermined range from the object T (when the distance between the object T and the vessel body 2 is within the first distance) in the on-shore assistance control, and controls the notifier 59 to provide a warning when the vessel speed is equal to or more than the first speed when the vessel body 2 enters the predetermined range from the object T. Thus, when the vessel body 2 is near the object T and the vessel speed is high, the vessel operator is notified by the warning that it is necessary to operate the marine vessel 1 carefully.

According to the first preferred embodiment of the present invention, the controller 31 determines whether or not the vessel body 2 has been reduced in speed after the warning, and controls the jet propulsion units 4L and 4R and the side thruster 36 to generate the thrust that moves the vessel body 2 in the direction opposite to the direction toward the object T when the vessel body 2 has not been reduced in speed after the warning. Thus, when the vessel operator does not operate the marine vessel 1 properly even after the vessel operator is notified that it is necessary to operate the marine vessel 1 carefully, the controller 31 generates the thrust that moves the vessel body 2 in the direction opposite to the direction toward the object T such that collision of the vessel body 2 against the object T caused by an insufficient reduction in vessel speed is automatically prevented.

According to the first preferred embodiment of the present invention, the controller 31 determines whether or not the marine vessel 1 is docking (step S2 and step S3), and executes the on-shore assistance control when determining that the marine vessel 1 is docking. Furthermore, the controller 31 determines whether or not the marine vessel 1 is moving away from the shore (step S22), and executes the off-shore assistance control when determining that the marine vessel 1 is moving away from the shore. Thus, execution of the on-shore/off-shore assistance control in the marine vessel 1 is significantly reduced or prevented when the marine vessel 1 is not docking or moving away from the shore.

According to the first preferred embodiment of the present invention, the marine vessel 1 includes the starting switch 58 on the side on which the remote control 15 is located relative to the steering operator 14. Thus, the vessel operator is able to perform an input operation of docking or moving away from the shore on a side on which the vessel operator takes his or her hand off the steering operator 14 when operating the remote control 15. Consequently, it is not necessary for the vessel operator to completely take his or her hands off the steering operator when the vessel operator performs the input operation, and hence the vessel operator continues to hold the steering operator 14. Consequently, even in a state where the vessel body 2 is turned, the vessel operator is able to perform the input operation of docking or moving away from the shore.

According to the first preferred embodiment of the present invention, the controller 31 controls the directions in which the thrusts of the jet propulsion units 4L and 4R are generated independently of each other. Thus, the marine vessel 1 is able to easily perform a turning movement operation, a forward and rearward movement operation, a right-left translation movement operation, a turning round operation, etc., and hence the controller 31 controls the movement of the marine vessel 1 more carefully in the on-shore/off-shore assistance control.

According to the first preferred embodiment of the present invention, the controller 31 executes the on-shore/off-shore assistance control based on the turning angular velocity of the vessel body 2. Thus, the controller 31 properly controls the orientation of the marine vessel 1 in the on-shore/off-shore assistance control.

According to the first preferred embodiment of the present invention, the controller 31 executes the on-shore/off-shore assistance control when the remote control 15 is operated such that the shift states of the jet propulsion units 4L and 4R each are the neutral state and the throttle opening degrees of the engines 3L and 3R each are the idling opening degree. Thus, the on-shore/off-shore assistance control is started in a state where the thrusts of the jet propulsion units 4L and 4R are not substantially generated, and hence the on-shore/off-shore assistance control is properly started.

According to the first preferred embodiment of the present invention, the controller 31 starts the on-shore/off-shore assistance control when the vessel speed and the turning angular velocity (determination parameter) of the vessel body 2 are equal to or less than the first speed threshold and the first turning angular velocity threshold is equal to or less than the first threshold, respectively. Thus, start of the on-shore/off-shore assistance control from a state where the vessel speed and the turning angular velocity are high is significantly reduced or prevented, and hence the on-shore/off-shore assistance control is easily started even on water in which a large inertia is likely to occur and it is difficult to quickly turn the vessel body 2, for example.

According to the first preferred embodiment of the present invention, the controller 31 stops execution of the on-shore/off-shore assistance control when determining that the determination parameter is equal to or more than the second threshold during execution of the on-shore/off-shore assistance control. Thus, continuation of the on-shore/off-shore assistance control is significantly reduced or prevented when the on-shore/off-shore assistance control is not properly executed due to a large determination parameter value. Furthermore, when the vessel operator operates the marine vessel 1 such that the determination parameter value is increased, for example, the on-shore/off-shore assistance control in execution is stopped, and the marine vessel 1 is restored to a normal state. Thus, the vessel operator is able to restore the control state of the marine vessel 1 to the normal state (a state where the on-shore/off-shore assistance control is not executed) without performing a special operation.

Second Preferred Embodiment

A second preferred embodiment of the present invention is now described with reference to FIGS. 9 to 12. In the second preferred embodiment, in addition to the structure of the marine vessel 1 according to the first preferred embodiment, generation of thrusts of jet propulsion units 4L and 4R is reduced or prevented at the time of on-shore assistance control.

Figure 9:
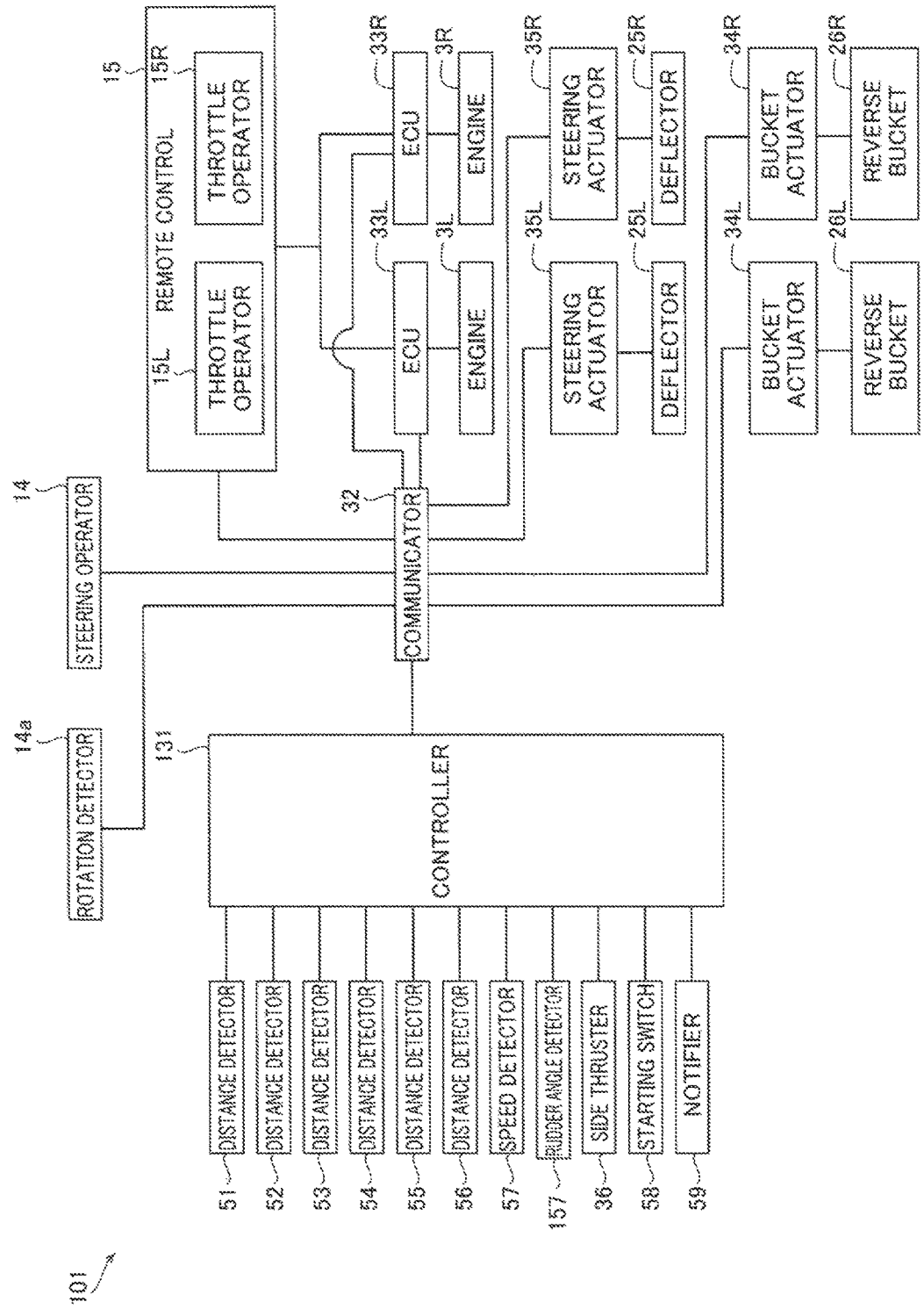
FIG. 9 is a block diagram of a marine vessel according to a second preferred embodiment of the present invention.

A marine vessel 101 according to the second preferred embodiment further includes a rudder angle detector 157 that detects the rudder angles of the jet propulsion units 4L and 4R (see FIG. 1) in addition to the structure of the marine vessel 1 according to the first preferred embodiment, as shown in FIG. 9. The rudder angle detector 157 detects the rudder angle of the marine vessel 101 by detecting the direction of a deflector 25L and the direction of a deflector 25R. The rudder angles of the jet propulsion units 4L and 4R may be obtained based on the rotational speeds of the deflectors 25L and 25R, the sliding amount of an arm (not shown) connected to the deflectors 25L and 25R, the variations (variations in oil quantity when the steering actuators 35L and 35R are hydraulic cylinders, for example) of the steering actuators 35L and 35R, or the like.

Figure 10:
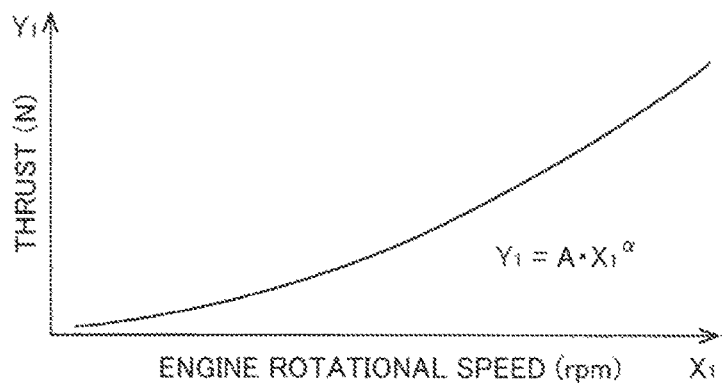
FIG. 10 is a graph illustrating engine rotational speed-thrust characteristics during forward propulsion in the marine vessel according to the second preferred embodiment of the present invention.
Figure 11:
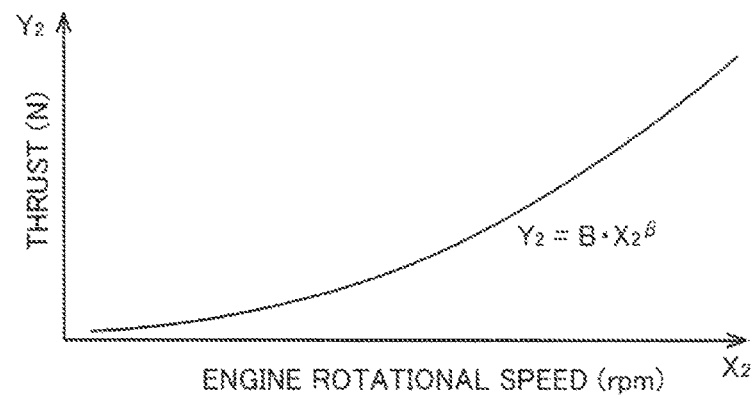
FIG. 11 is a graph illustrating engine rotational speed-thrust characteristics during reverse propulsion in the marine vessel according to the second preferred embodiment of the present invention.

The marine vessel 101 includes a controller 131 instead of the controller 31 of the marine vessel 1 according to the first preferred embodiment. The controller 131 acquires the thrusts of the jet propulsion units 4L and 4R based on the engine rotational speeds, and executes on-shore/off-shore assistance control based on the acquired thrusts of the jet propulsion units 4L and 4R. Specifically, a memory of the controller 131 stores the graphs shown in FIGS. 10 and 11. The graph (a graph illustrating engine rotational speed-thrust characteristics during forward propulsion) shown in FIG. 10 illustrates the thrusts (N) generated from the jet propulsion units 4L and 4R that correspond to the engine rotational speeds (rpm) during forward propulsion. The graph (a graph illustrating engine rotational speed-thrust characteristics during reverse propulsion) shown in FIG. 11 illustrates the thrusts (N) generated from the jet propulsion units 4L and 4R that correspond to the engine rotational speeds (rpm) during reverse propulsion. The graph illustrating engine rotational speed-thrust characteristics during forward propulsion and the graph illustrating engine rotational speed-thrust characteristics during reverse propulsion are obtained in advance by testing or the like.

The controller 131 acquires the thrusts of the jet propulsion units 4L and 4R based on the engine rotational speeds acquired from ECUs 33L and 33R, the graph (see FIG. 10) illustrating engine rotational speed-thrust characteristics during forward propulsion stored in the memory, and the graph (see FIG. 11) illustrating engine rotational speed-thrust characteristics during reverse propulsion. The controller 131 controls the thrusts of the jet propulsion units 4L and 4R, for example, in the on-shore/off-shore assistance control based on the acquired thrusts of the jet propulsion units 4L and 4R and the rudder angles of the jet propulsion units 4L and 4R based on the direction of the deflector 25L and the direction of the deflector 25R acquired from the rudder angle detector 157.

As feedback control, the controller 131 calculates the desired thrusts of the jet propulsion units 4L and 4R, and controls the engine rotational speeds based on the graph illustrating engine rotational speed-thrust characteristics during forward propulsion and the graph illustrating engine rotational speed-thrust characteristics during reverse propulsion. As feedback control, the controller 131 calculates the desired rudder angles of the jet propulsion units 4L and 4R, and controls the steering actuators 35L and 35R. The remaining structure of the marine vessel 101 and off-shore assistance control executed by the controller 131 according to the second preferred embodiment are preferably similar to those according to the first preferred embodiment.

Figure 12:
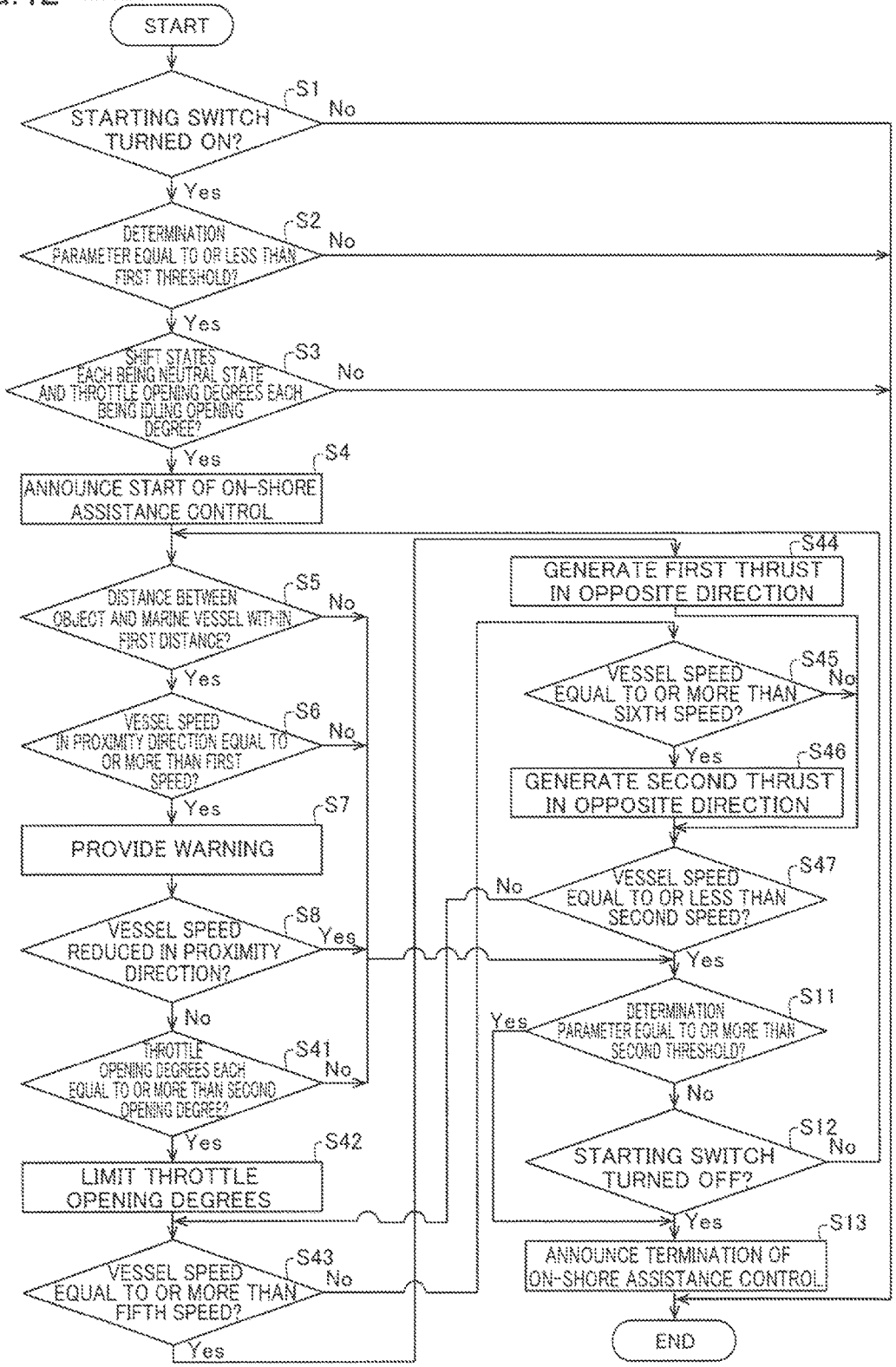
FIG. 12 is a flowchart showing a process for on-shore assistance control in the marine vessel according to the second preferred embodiment of the present invention.

The on-shore assistance control executed by the controller 131 is now described with reference to FIG. 12. In the on-shore assistance control according to the second preferred embodiment, only assistance control in a forward movement direction and a reverse movement direction is different from the on-shore assistance control according to the first preferred embodiment, and on-shore assistance control in a right-left direction is similar to that according to the first preferred embodiment.

First, the controller 131 executes control in step S1 to step S8, similarly to the on-shore assistance control according to the first preferred embodiment. The controller 131 determines whether or not throttle opening degrees each are equal to or more than a second opening degree in step S41 when the vessel speed has not been reduced in a proximity direction (the vessel speed has not been reduced in any of a plurality of proximity directions) in step S8.

When the throttle opening degrees each are not equal to or more than the second opening degree, the controller 131 advances to step S11. When the throttle opening degrees each are equal to or more than the second opening degree, the upper values of the throttle opening degrees are set such that a first limit of the throttle opening degrees is performed in step S42. Thus, a thrust toward an object T is reduced below a thrust that corresponds to the throttle opening degrees operated by a vessel operator.

The controller 131 determines whether or not the vessel speed in the proximity direction is equal to or more than a fifth speed in step S43. When the vessel speed in the proximity direction is not equal to or more than the fifth speed, the controller 131 advances to step S45. When the vessel speed in the proximity direction is equal to or more than the fifth speed, a first thrust in a direction opposite to the direction (proximity direction) toward the object T is generated in step S44. Then, the controller 131 advances to step S47.

The controller 131 determines whether or not the vessel speed in the proximity direction is equal to or more than a sixth speed in step S45. The sixth speed is lower than the fifth speed. When the vessel speed in the proximity direction is not equal to or more than the sixth speed, the controller 131 determines that the vessel speed has been sufficiently reduced, and advances to step S47. When the vessel speed in the proximity direction is equal to or more than the sixth speed (equal to or less than the fifth speed), a second thrust in the direction opposite to the direction (proximity direction) toward the object T is generated in step S46. The magnitude of the second thrust is smaller than the magnitude of the first thrust. Consequently, the magnitude of the thrust in the direction opposite to the proximity direction is reduced in stages according to a reduction in the speed in the proximity direction.

The controller 131 determines whether or not the vessel speed in the proximity direction is equal to or less than the second speed in step S47. When the vessel speed in the proximity direction is not equal to or less than the second speed, the controller 131 returns to step S43. When the vessel speed in the proximity direction is equal to or less than the second speed, the controller 131 advances to step S11. Then, the controller 131 performs control in step S11 to step S13, similarly to the first preferred embodiment.

According to the second preferred embodiment of the present invention, the following advantageous effects are obtained.

According to the second preferred embodiment of the present invention, the controller 131 controls the jet propulsion units 4L and 4R to reduce or prevent generation of the thrust that moves a vessel body 2 in the direction (proximity direction) toward the object T when determining that the vessel body 2 has not been reduced in speed after the warning. Thus, when the vessel operator does not operate the marine vessel 101 properly even after the vessel operator is notified that it is necessary to operate the marine vessel 101 carefully, the controller 131 reduces or prevents generation of the thrust that moves the vessel body 2 in the direction toward the object T such that collision of the vessel body 2 against the object T caused by an insufficient reduction in vessel speed is automatically prevented.

According to the second preferred embodiment of the present invention, the controller 131 limits the upper values of the throttle opening degrees of the engines 3L and 3R to reduce or prevent generation of the thrust that moves the vessel body 2 in the direction toward to the object T. Thus, generation of the thrust that moves the vessel body 2 in the direction toward the object T is easily reduced or prevented.

According to the second preferred embodiment of the present invention, the controller 131 changes, in stages, the magnitude of the thrust that moves the vessel body 2 in the direction opposite to the direction toward the object T according to the magnitude of the vessel speed. Thus, in the case of high urgency such as when the distance to the object T is short and the vessel speed is high, the thrust that moves the vessel body 2 in the direction opposite to the direction toward the object T is increased such that collision of the vessel body 2 against the object T is reliably prevented. On the other hand, in the case of low urgency such as when the distance to the object T is long or the vessel speed is low, the thrust that moves the vessel body 2 in the direction opposite to the direction toward the object T is reduced such that causing the vessel operator discomfort associated with a change in thrust is significantly reduced or prevented.

According to the second preferred embodiment of the present invention, the controller 131 acquires the thrusts of the jet propulsion units 4L and 4R based on the engine rotational speeds, and executes the on-shore/off-shore assistance control based on the acquired thrusts of the jet propulsion units 4L and 4R. Thus, thrusts to be output from the jet propulsion units 4L and 4R after this are controlled based on the acquired thrusts of the jet propulsion units 4L and 4R, and hence the jet propulsion units 4L and 4R are more accurately controlled. The remaining effects of the marine vessel 101 according to the second preferred embodiment are similar to those according to the first preferred embodiment.

Third Preferred Embodiment

A third preferred embodiment of the present invention is now described with reference to FIG. 13. In the third preferred embodiment, unlike the structure of the marine vessel 1 according to the first preferred embodiment, a wireless remote control 260 includes a switch 261. The wireless remote control 260 and the switch 261 are examples of a "first wireless remote" and a "wireless operator", respectively.

Figure 13:
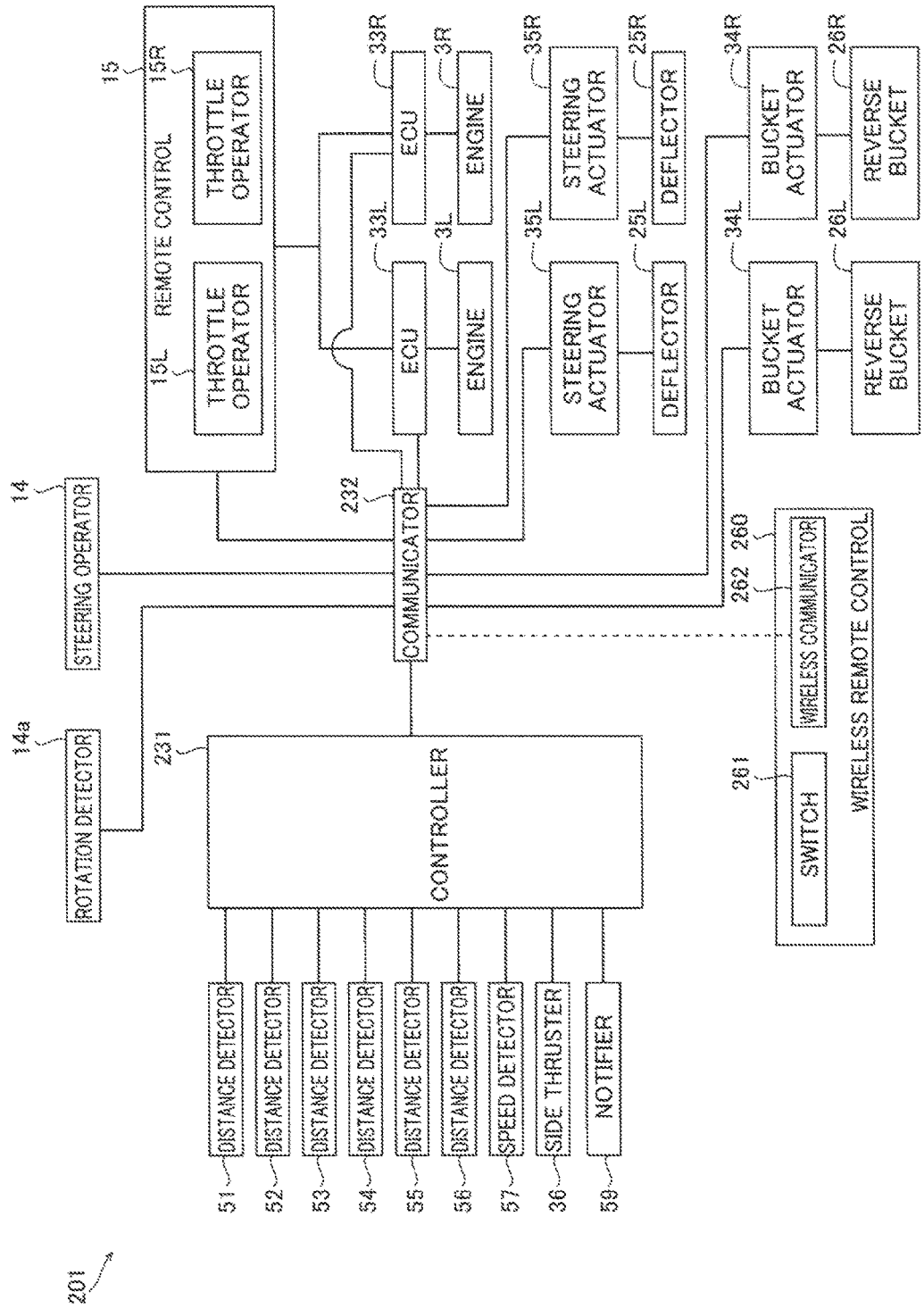
FIG. 13 is a block diagram of a marine vessel according to a third preferred embodiment of the present invention.

A marine vessel 201 according to the third preferred embodiment further includes the wireless remote control 260 in addition to the structure of the marine vessel 1 according to the first preferred embodiment, as shown in FIG. 13. The wireless remote control 260 includes the switch 261 that switches on and off on-shore/off-shore assistance control and a wireless communicator 262 that performs wireless communication with a communicator 232 that performs not only wired but also wireless communication (receiving). Thus, a vessel operator switches on and off the on-shore/off-shore assistance control with the switch 261 such that a controller 231 determines whether or not the marine vessel 201 is docking or moving away from the shore through the wireless communicator 262 and the communicator 232. The switch 261 is operated by the vessel operator at the time of emergency stopping of the marine vessel 201. Wireless communication includes Bluetooth (registered trademark), Wi-Fi, infrared communication, etc. The communicator 232 is an example of a "first wireless receiver".

The remaining structures of the marine vessel 201 and on-shore/off-shore assistance control executed by the controller 231 according to the third preferred embodiment are similar to those according to the first preferred embodiment.

According to the third preferred embodiment of the present invention, the following advantageous effects are obtained.

According to the third preferred embodiment of the present invention, the controller 231 determines that the marine vessel 201 is docking or moving away from the shore based on operation information wirelessly received by the wireless remote control 260 through the communicator 232. Thus, the vessel operator performs an input operation on the wireless remote control 260 such that it is not necessary for the vessel operator to completely take his or her hands off a steering operator 14, and hence the vessel operator continues to hold the steering operator 14. Consequently, even in a state where the vessel body 2 is turned, the vessel operator is able to perform the operation of docking or moving away from the shore. The remaining effects of the marine vessel 201 according to the third preferred embodiment are similar to those according to the first preferred embodiment.

Fourth Preferred Embodiment

A fourth preferred embodiment of the present invention is now described with reference to FIGS. 14 and 15. In the fourth preferred embodiment, a wireless remote control 360 that acquires positional information is used in addition to the structure of the marine vessel 1 according to the first preferred embodiment. The wireless remote control 360 is an example of a "second wireless remote".

Figure 14:
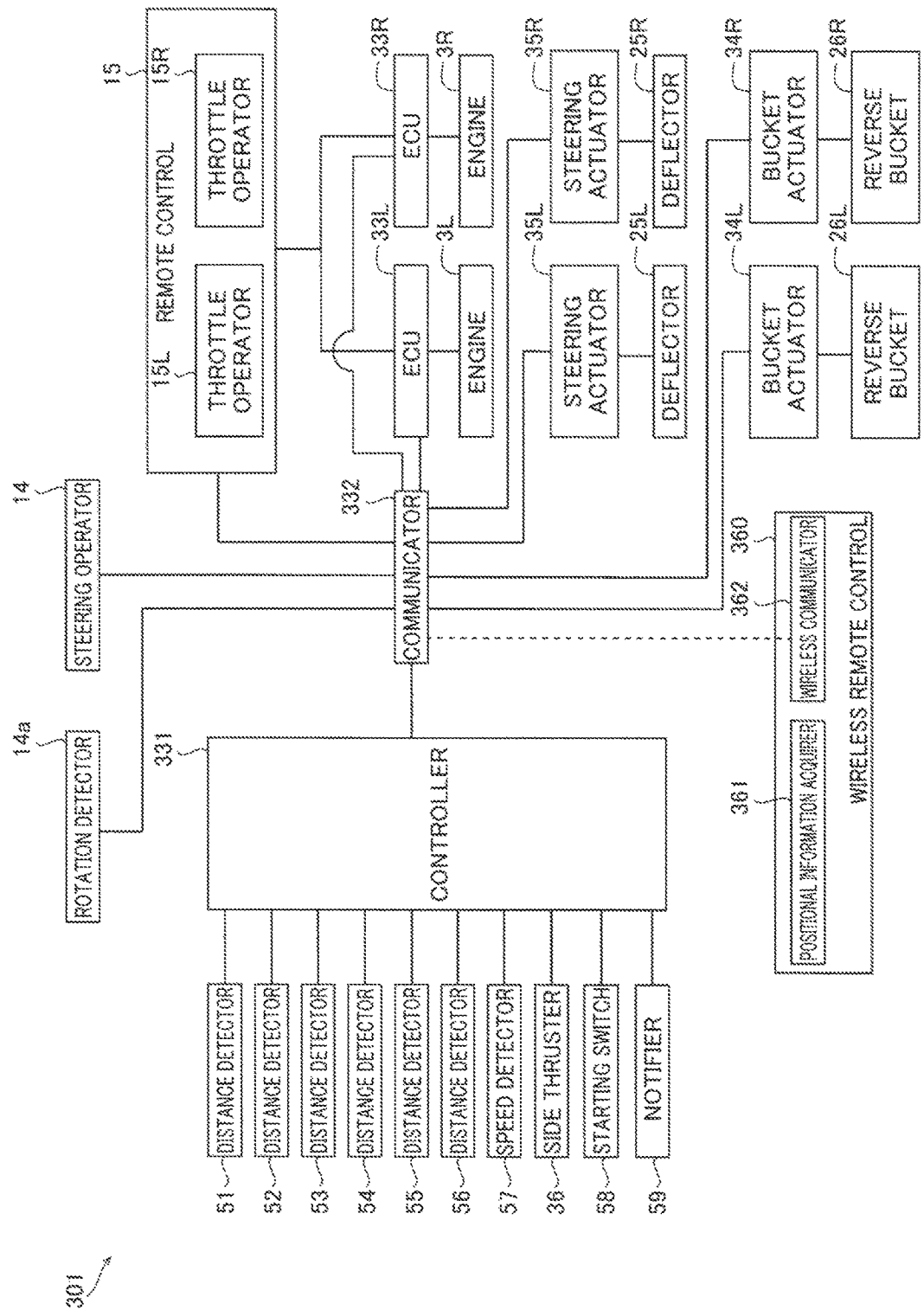
FIG. 14 is a block diagram of a marine vessel according to a fourth preferred embodiment of the present invention.
Figure 15:
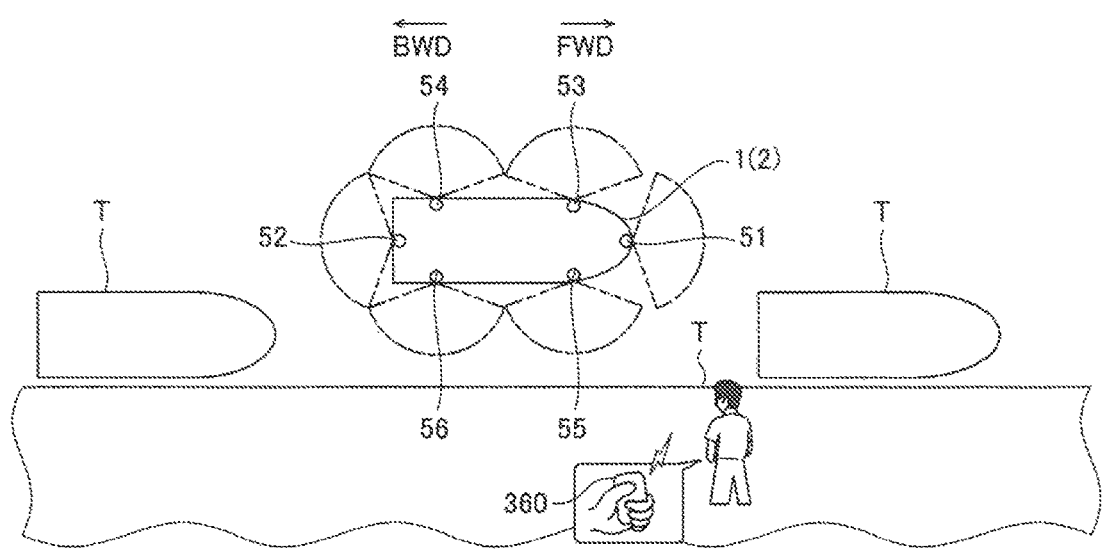
FIG. 15 is a plan view schematically showing the state of the marine vessel according to the fourth preferred embodiment of the present invention at the time of on-shore assistance control.

A marine vessel 301 according to the fourth preferred embodiment further includes the wireless remote control 360 in addition to the structure of the marine vessel 1 according to the first preferred embodiment, as shown in FIG. 14. The wireless remote control 360 includes a positional information acquirer 361 that acquires the positional information of the wireless remote control 360 with a GNSS and a wireless communicator 362 that performs wireless communication with a communicator 332 that performs not only wired but also wireless communication (receiving). The controller 331 sets the position (see FIG. 15) of the wireless remote control 360 as a target docking position for a vessel body 2 based on the positional information of the wireless remote control 360 received through the wireless communicator 362 and the communicator 332, and executes on-shore assistance control to dock the vessel body 2 at the target docking position. In other words, the controller 331 executes the on-shore assistance control, such as reducing generation of a thrust in a direction opposite to a proximity direction, setting an object T located near the target docking position of objects T as the shore (dock) (target object T) at which the marine vessel 301 is docked, which is different from on-shore assistance control performed with respect to another object T. The communicator 332 is an example of a "second wireless receiver".

The position of the wireless remote control 360 may be set as the target docking position for the vessel body 2 based on the positional information of the wireless remote control 360, and on-shore control may be automatically executed such that the vessel body 2 is docked at the target docking position. Thus, when the anchorage of the marine vessel 301 that is anchored is released, for example, the marine vessel 301 automatically returns to the target docking position. The remaining structures of the marine vessel 301 and on-shore/off-shore assistance control executed by the controller 331 according to the fourth preferred embodiment are similar to those according to the first preferred embodiment.

According to the fourth preferred embodiment of the present invention, the following advantageous effects are obtained.

According to the fourth preferred embodiment of the present invention, the controller 331 sets the position of the wireless remote control 360 as the target docking position for the vessel body 2 based on the positional information wirelessly received by the wireless remote control 360 through the communicator 332, and executes the on-shore assistance control to dock the vessel body 2 at the target docking position. Thus, in the on-shore assistance control, the vessel body 2 is reliably docked at the target docking position based on the positional information. The remaining effects of the marine vessel 301 according to the fourth preferred embodiment are similar to those according to the first preferred embodiment.

Fifth Preferred Embodiment

A fifth preferred embodiment of the present invention is now described with reference to FIG. 16. In the fifth preferred embodiment, the function of a smartphone 470 is used in place of the partial function of the marine vessel 1 according to the first preferred embodiment. The smartphone 470 is an example of a "distance detector" or a "speed detector".

Figure 16:
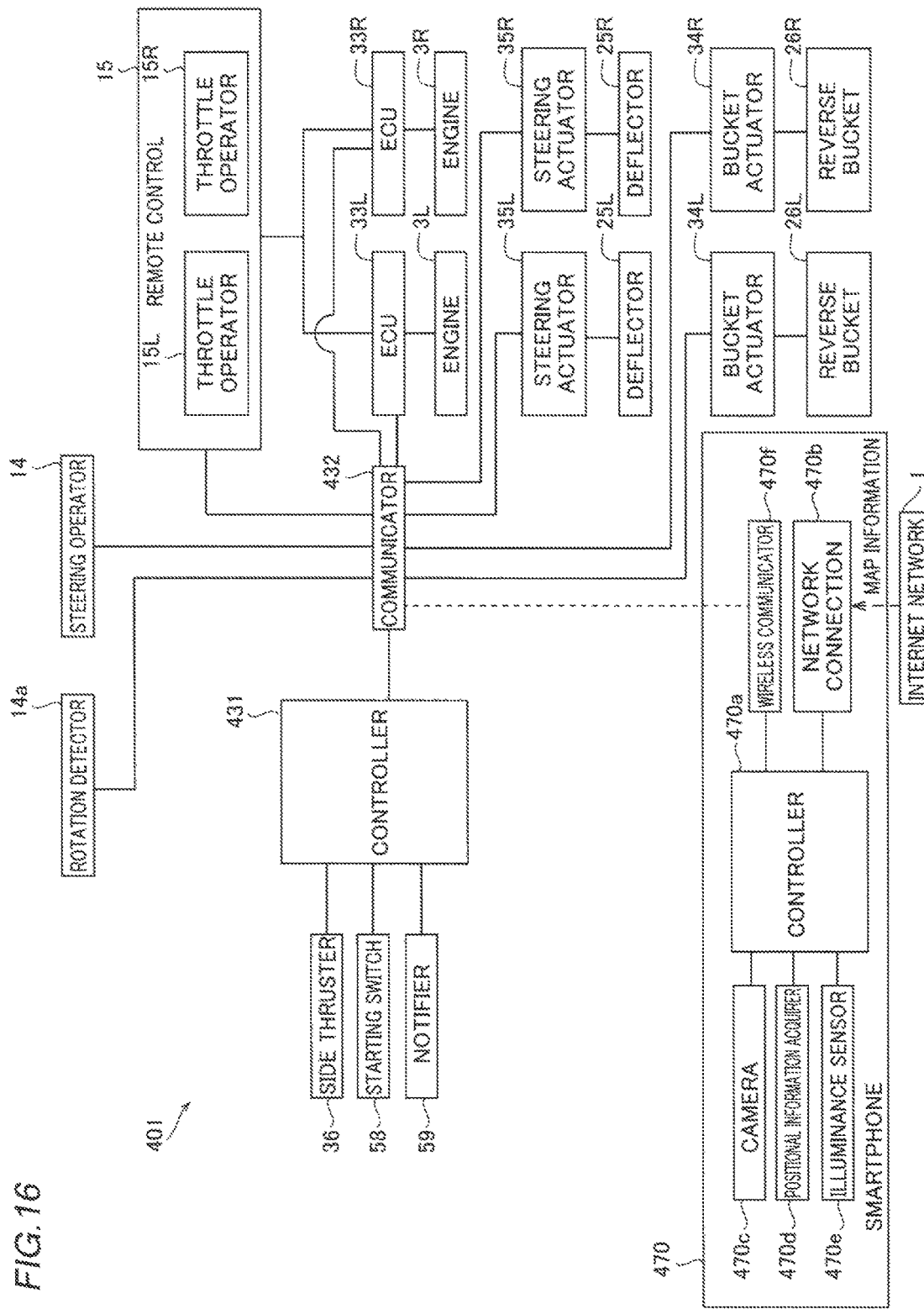
FIG. 16 is a block diagram of a marine vessel according to a fifth preferred embodiment of the present invention.

As shown in FIG. 16, a marine vessel 401 according to the fifth preferred embodiment includes neither distance detectors nor a speed detector, unlike the marine vessel 1 according to the first preferred embodiment. On the other hand, a communicator 432 of the marine vessel 401 performs wireless communication with the smartphone 470 mounted on a vessel body 2.

The smartphone 470 includes a controller 470a that controls the entire smartphone 470 and a network connection 470b that connects to the Internet network I. The smartphone 470 includes a camera 470c that calculates a distance to an object T and a positional information acquirer 470d that acquires the positional information of the smartphone 470 with a GNSS. The smartphone 470 includes an illuminance sensor 470e that detects an illuminance around the smartphone 470. The smartphone 470 includes a wireless communicator 470f that performs wireless communication with the marine vessel 401 by Bluetooth (registered trademark) or Wi-Fi, for example.

According to the fifth preferred embodiment, a controller 431 of the marine vessel 401 acquires information used for on-shore/off-shore assistance control from the smartphone 470. Specifically, the controller 431 acquires the distance between the marine vessel 401 and the object T acquired by image processing performed by the controller 470a of the smartphone 470 through the wireless communicator 470f and the communicator 432. The controller 431 may acquire the distance between the marine vessel 401 and the object T by processing an image acquired by the camera 470c of the smartphone 470. The controller 431 acquires a vessel speed and a turning angular velocity based on the acquired positional information of the smartphone 470. The controller 431 executes on-shore/off-shore assistance control based on the information acquired from the smartphone 470.

The controller 431 calculates a solar radiation direction from the acquired illuminance around the smartphone 470. The controller 431 controls the smartphone 470 to acquire surrounding map information from the Internet network I through the internet connection 470b and transmits the map information to the marine vessel 401. Thus, the controller 431 acquires the surrounding map information from the Internet network I and uses the map information for the on-shore/off-shore assistance control, for example. The remaining structure of the marine vessel 401 and on-shore/off-shore assistance control executed by the controller 431 according to the fifth preferred embodiment are similar to those according to the first preferred embodiment.

According to the fifth preferred embodiment of the present invention, the following advantageous effects are obtained.

According to the fifth preferred embodiment of the present invention, the controller 431 executes the on-shore/off-shore assistance control based on the information acquired from the smartphone 470. Thus, the structure of the marine vessel 401 is simplified. The remaining effects of the marine vessel 401 according to the fifth preferred embodiment are similar to those according to the first preferred embodiment.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

For example, while the marine vessel 1 (101, 201, 301, 401) preferably includes the engines 3L and 3R and the jet propulsion units 4L and 4R in each of the first to fifth preferred embodiments described above, the present invention is not restricted to this. The present invention is not restricted to two engines and jet propulsion units, and the marine vessel may alternatively include one engine and one jet propulsion unit or three or more engines and three or more jet propulsion units. It is not necessary to provide an engine with respect to each jet propulsion unit, but one engine may alternatively drive a plurality of jet propulsion units.

While the vessel operator preferably operates the starting switch 58 located on the vessel body 2 to start control of the on-shore/off-shore assistance function in each of the first, second, fourth, and fifth preferred embodiments described above, and the vessel operator preferably operates the switch 261 located on the wireless remote control 260 to start control of the on-shore/off-shore assistance function in the third preferred embodiment described above, the present invention is not restricted to this. The vessel operator may alternatively make a sound to start control of the on-shore/off-shore assistance function, for example.

While the controller 31 (131) preferably determines whether or not the vessel speed and the turning angular velocity of the vessel body 2 (determination parameter) are equal to or less than the first speed threshold and equal to or less than the first turning angular velocity threshold (equal to or less than the first threshold), respectively, and starts the on-shore/off-shore assistance control when determining that the determination parameter is equal to or less than the first threshold in each of the first and second preferred embodiments described above, the present invention is not restricted to this. As the determination parameter, any of the acceleration of the vessel body, the turning angular acceleration of the vessel body, the engine rotational speed, and the thrust of the propulsion unit may alternatively be used. The number of determination parameters may alternatively be at least one and not more than six so far as at least one of the vessel speed, the acceleration of the vessel body, the turning angular velocity of the vessel body, the turning angular acceleration of the vessel body, the engine rotational speed, and the thrust of the propulsion unit is used as a determination parameter.

While the marine vessel 1 (101, 201, 301, 401) is preferably a jet propelled boat including the jet propulsion units 4L and 4R in each of the first to fifth preferred embodiments described above, the present invention is not restricted to this. The marine vessel may alternatively be a marine vessel including an outboard motor that includes a propeller, for example. In other words, the propulsion unit is not restricted to jet propulsion units, but may alternatively be another propulsion device such as an outboard motor. In this case, the controller of the marine vessel acquires the thrust of the outboard motor based on the propeller rotational speed, and executes the on-shore/off-shore assistance control based on the acquired thrust of the outboard motor.

While the side thruster 36 preferably generates a thrust in the right-left direction in the marine vessel 1 (101, 201, 301, 401) in each of the first to fifth preferred embodiments described above, the present invention is not restricted to this. A propulsion unit other than a side thruster may alternatively generate a thrust in the right-left direction. In a marine vessel including a plurality of outboard motors, for example, the outboard motors may be turned in the right-left direction, and a thrust in the right-left direction may be generated by the total thrust of the outboard motors. Alternatively, a thrust in the right-left direction may be generated by the total thrust of the plurality of jet propulsion units or the total thrust of a plurality of side thrusters 36, for example.

While the magnitude of the thrust in the direction opposite to the proximity direction is preferably reduced in stages according to a reduction in the speed in the proximity direction in the second preferred embodiment described above, the present invention is not restricted to this. The magnitude of the thrust in the direction opposite to the proximity direction may alternatively be reduced in stages according to a reduction in the distance to the object in the proximity direction.

While millimeter-wave radars are preferably used as the distance detectors 51 to 56 in the first preferred embodiment described above, and the smartphone 470 (camera 470c) is preferably used as the distance detector in the fifth preferred embodiment described above, the present invention is not restricted to this. Devices other than millimeter-wave radars and a smartphone may alternatively be used as the distance detectors as long as the distance between the marine vessel and the object is measurable. Ultrasonic sensors, radars other than the millimeter-wave radars, laser sensors, or laser radars (LiDAR) may be used as the distance detectors, for example.

While the directions in which the thrusts of the jet propulsion units 4L and 4R are generated are preferably controlled independently of each other in the marine vessel 1 in the first preferred embodiment described above, the present invention is not restricted to this. The direction in which the thrust of the portside jet propulsion unit is generated and the direction in which the thrust of the starboard jet propulsion unit is generated may not be controlled independently of each other, but may be controlled together to be the same as each other in the marine vessel. In this case, the marine vessel preferably includes only one steering actuator, for example, and the number of components is reduced.

While the controller 31 preferably determines that the marine vessel 1 is docking or moving away from the shore when the remote control 15 is operated such that the determination parameter is equal to or less than the first threshold, the shift states of the jet propulsion units 4L and 4R each are the neutral state, and the throttle opening degrees of the engines 3L and 3R each are the idling opening degree in the first preferred embodiment described above, the present invention is not restricted to this. The controller may alternatively determine whether or not the marine vessel is docking or moving away from the shore based on the position of the marine vessel, or may alternatively determine that the marine vessel is docking or moving away from the shore when a control mode used at the time of docking and moving away from the shore, such as a no-wake mode, is executed, for example. Thus, erroneous detection of waves or the like as the object caused by execution of the on-shore/off-shore assistance control in the marine vessel under way is significantly reduced or prevented.

While the rotation detector 14*a* preferably detects the rotation angle of the steering operator 14 in the steering operation of the vessel operator in the first preferred embodiment described above, the present invention is not restricted to this. The rotation detector may alternatively detect the rotational speed of the steering operator in the steering operation of the vessel operator or may alternatively detect a load applied to the vessel body when the vessel operator turns the rudder of the marine vessel.

While in the off-shore assistance control, only assistance control in the forward movement direction and the reverse movement direction is preferably executed and no assistance control in the right-left direction is preferably executed in the first preferred embodiment described above, the present invention is not restricted to this. Also in the off-shore assistance control, assistance control in the right-left direction may alternatively be executed similarly to the on-shore assistance control.

While the distance between the marine vessel 401 and the object T, the vessel speed, and the turning angular velocity are preferably acquired by the smartphone 470 in the fifth preferred embodiment described above, the present invention is not restricted to this. The acceleration of the vessel body and the speed of the vessel body may alternatively be detected by an acceleration detector located in the smartphone.

While the process operations performed by the controller are described using a flowchart in a flow-driven manner in which processes are performed in order along a process flow for the convenience of illustration in each of the first and second preferred embodiments described above, the present invention is not restricted to this. The process operations performed by the controller may alternatively be performed in an event-driven manner in which the processes are performed on an event basis. In this case, the process operations performed by the controller may be performed in a complete event-driven manner or in a combination of an event-driven manner and a flow-driven manner.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A marine vessel comprising:
   a vessel body;
   an engine located on the vessel body;
   a propulsion unit that is driven by the engine and generates a thrust that moves the vessel body;
   a distance detector that measures a distance to an object;
   a speed detector that detects a vessel speed; and
   a controller configured or programmed to execute a docking/moving away from shore assistance control during which a vessel operator uses a steering operator and/or a remote controller to dock the marine vessel or move the marine vessel away from shore, and in which the controller automatically controls the propulsion unit to generate a thrust that moves the vessel body in a direction opposite to a direction toward the object based on the distance to the object measured by the distance detector and the vessel speed detected by the speed detector.

2. The marine vessel according to claim 1, wherein the controller is configured or programmed to change, in stages, a magnitude of the thrust that moves the vessel body in the direction opposite to the direction toward the object based on the distance to the object and the vessel speed.

3. The marine vessel according to claim 1, wherein
   the propulsion unit includes a plurality of propulsion units; and
   the controller is configured or programmed to control, independently of each other, directions in which thrusts of the plurality of propulsion units are generated.

4. The marine vessel according to claim 1, wherein the controller is configured or programmed to execute the docking/moving away from shore assistance control based on a turning angular velocity of the vessel body.

5. The marine vessel according to claim 1, wherein the controller is configured or programmed to acquire the thrust of the propulsion unit based on at least one of an engine rotational speed and a propeller rotational speed, and to execute the docking/moving away from shore assistance control based on the acquired thrust of the propulsion unit.

6. The marine vessel according to claim 1, further comprising the remote controller that allows the vessel operator to switch a shift state of the propulsion unit and a throttle opening degree of the engine;
   wherein the controller is configured or programmed to start the docking/moving away from shore assistance control when the remote controller is operated such that the shift state of the propulsion unit is a neutral state and the throttle opening degree of the engine is an idling opening degree.

7. The marine vessel according to claim 1, wherein the propulsion unit includes a jet propulsion unit that moves the vessel body in a forward-rearward direction.

8. The marine vessel according to claim 7, wherein the controller is configured or programmed to control the jet propulsion unit to generate, in the forward-rearward direction, the thrust that moves the vessel body in the direction opposite to the direction toward the object in the docking/moving away from shore assistance control.

9. The marine vessel according to claim 1, wherein the propulsion unit includes a side thruster that moves the vessel body in a right-left direction.

10. The marine vessel according to claim 9, wherein the controller is configured or programmed to control the side thruster to generate, in the right-left direction, the thrust that moves the vessel body in the direction opposite to the direction toward the object in the docking/moving away from shore assistance control.

11. The marine vessel according to claim 1, further comprising an alarm that provides a warning when the vessel speed is equal to or more than a predetermined speed when the vessel body enters a predetermined range from the object in the docking/moving away from shore assistance control executed by the controller.

12. The marine vessel according to claim 11, wherein the controller is configured or programmed to control the propulsion unit to generate the thrust that moves the vessel body in the direction opposite to the direction toward the object when the vessel body is not reduced in speed after the warning.

13. The marine vessel according to claim 11, wherein the controller is configured or programmed to control the propulsion unit to reduce or prevent generation of a thrust that moves the vessel body in the direction toward the object when the vessel body is not reduced in speed after the warning.

14. The marine vessel according to claim 13, wherein the controller is configured or programmed to limit an upper value of a throttle opening degree of the engine to reduce or prevent generation of the thrust that moves the vessel body in the direction toward to the object.

15. The marine vessel according to claim 1, wherein the controller is configured or programmed to determine whether or not the marine vessel is docking or moving away from shore, and to execute the docking/moving away from shore assistance control when determining that the marine vessel is docking or moving away from the shore.

16. The marine vessel according to claim 15, further comprising:
the steering operator on which the vessel operator performs a steering operation;
the remote controller that allows the vessel operator to switch a shift state of the propulsion unit and a throttle opening degree of the engine; and
a switch on which the vessel operator performs an input operation of docking or moving away from the shore such that the controller determines that the marine vessel is docking or moving away from the shore; wherein
the switch is located on the steering operator or is located on a side on which the remote controller is located relative to the steering operator.

17. The marine vessel according to claim 15, further comprising:
a first wireless remote that includes a wireless operator on which the vessel operator performs an input operation of docking or moving away from the shore, and wirelessly transmits operation information based on the input operation; and
a first wireless receiver that is located on the vessel body and wirelessly receives the operation information from the first wireless remote; wherein
the controller is configured or programmed to determine that the marine vessel is docking or moving away from the shore based on the operation information received through the first wireless receiver.

18. The marine vessel according to claim 1, wherein the controller is configured or programmed to start the docking/moving away from shore assistance control when a determination parameter of at least one of the vessel speed, an acceleration of the vessel body, a turning angular velocity of the vessel body, a turning angular acceleration of the vessel body, an engine rotational speed, and the thrust of the propulsion unit is equal to or less than a first threshold.

19. The marine vessel according to claim 18, wherein the controller is configured or programmed to stop executing the docking/moving away from shore assistance control when the determination parameter is equal to or more than a second threshold during execution of the docking/moving away from shore assistance control.

* * * * *